United States Patent
Hajati et al.

(10) Patent No.: US 10,345,907 B2
(45) Date of Patent: Jul. 9, 2019

(54) HAPTIC ACTUATOR INCLUDING FIELD MEMBER MULTI-DIMENSIONAL POSITION DETERMINED BASED UPON COIL BACK ELECTROMOTIVE FORCE AND MOTOR CONSTANT VALUES AND RELATED METHODS

(71) Applicant: Apple Inc., Cupertino, CA (US)

(72) Inventors: Arman Hajati, San Mateo, CA (US); Kayo Yanagisawa, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 18 days.

(21) Appl. No.: 15/814,626

(22) Filed: Nov. 16, 2017

(65) Prior Publication Data

US 2019/0073034 A1 Mar. 7, 2019

Related U.S. Application Data

(60) Provisional application No. 62/553,330, filed on Sep. 1, 2017.

(51) Int. Cl.
| | | |
|---|---|---|
| *H01F 7/16* | (2006.01) | |
| *H02N 2/02* | (2006.01) | |
| *H01F 41/064* | (2016.01) | |
| *G06F 3/01* | (2006.01) | |

(52) U.S. Cl.
CPC ........... *G06F 3/016* (2013.01); *H01F 7/1638* (2013.01); *H01F 7/1653* (2013.01); *H01F 41/064* (2016.01); *H02N 2/028* (2013.01)

(58) Field of Classification Search
None
See application file for complete search history.

(56) References Cited

U.S. PATENT DOCUMENTS

| | | | |
|---|---|---|---|
| 8,169,402 | B2 | 5/2012 | Shahoian et al. |
| 9,607,491 | B1 * | 3/2017 | Mortimer ................. G08B 6/00 |
| 2014/0197936 | A1 | 7/2014 | Biggs et al. |
| 2015/0109223 | A1 | 4/2015 | Kessler et al. |
| 2015/0116205 | A1 | 4/2015 | Westerman et al. |
| 2015/0130730 | A1 | 5/2015 | Harley et al. |

(Continued)

FOREIGN PATENT DOCUMENTS

| | | |
|---|---|---|
| WO | 2013169299 A1 | 11/2013 |
| WO | 2013169303 A1 | 11/2013 |
| WO | 2013169305 A1 | 11/2013 |

(Continued)

OTHER PUBLICATIONS

Product Specification Sheet: Geeplus, VIBRO1 Vibration Actuator, 2 pages, www.geeplus.biz, downloaded on Jul. 15, 2015.

*Primary Examiner* — Nay Tun
*Assistant Examiner* — Shawna M Kingston
(74) *Attorney, Agent, or Firm* — Allen, Dyer, Doppelt + Gilchrist, P.A.

(57) ABSTRACT

A haptic actuator may include a housing, coils carried within the housing, and a field member moveable within the housing between the coils and including at least one permanent magnet. A controller may be coupled to the coils and configured to sense a respective back electromotive force (EMF) value of each of the coils and determine a position of the field member in dimensions based upon the back EMF values and motor constant values.

27 Claims, 17 Drawing Sheets

(56) References Cited

U.S. PATENT DOCUMENTS

2018/0021812 A1* 1/2018 Akanuma ............... B06B 1/045
                  310/25

FOREIGN PATENT DOCUMENTS

| WO | 2013170099 A1 | 11/2013 |
| WO | 2013188307 A2 | 12/2013 |
| WO | 2014018111 A1 | 1/2014 |
| WO | 2015020663 A1 | 2/2015 |

* cited by examiner

HAPTIC ACTUATOR INCLUDING FIELD MEMBER MULTI-DIMENSIONAL POSITION DETERMINED BASED UPON COIL BACK ELECTROMOTIVE FORCE AND MOTOR CONSTANT VALUES AND RELATED METHODS

RELATED APPLICATIONS

The present application claims the priority benefit of provisional application Ser. No. 62/553,330 filed on Sep. 1, 2017, the entire contents of which are herein incorporated in its entirety by reference.

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A haptic actuator may include a housing, a plurality of coils carried within the housing, and a field member moveable within the housing between the plurality of coils and that includes at least one permanent magnet. The haptic actuator may also include a controller coupled to the plurality of coils and configured to sense a respective back electromotive force (EMF) value of each of the plurality of coils and determine a position of the field member in a plurality of dimensions based upon the back EMF values and motor constant values.

The housing may have a top and bottom and the plurality of coils may include a plurality of coil pairs. Each coil pair may include top and bottom opposing coils and the motor constant values may correspond to respective motor constant values associated with each coil pair, for example. The controller may be configured to sense the respective back EMF value of each coil pair.

The housing may have a top and bottom, and the plurality of coils may include a plurality of coil pairs. Each coil pair may include top and bottom opposing coils, for example. The controller may be configured to sense the respective back EMF value of at least one coil pair while driving at least one other coil pair, for example.

The housing may have a top and bottom, and the plurality of coils may include a plurality of coil pairs. Each coil pair may include left and right opposing coils, and the motor constant values may correspond to respective motor constant values associated with each coil pair. The controller may be configured to sense the respective back EMF value of each coil pair, for example.

The housing may have a top and bottom, and the plurality of coils may include at least one coil pair, for example. The field member may have opposing first and second sides, and the haptic actuator may further include a respective at least one flexure bearing mounting each of the first and second sides of the field member to be reciprocally movable within the housing responsive to the at least one coil pair, for example. The respective at least one flexure bearing and the field member may have a resonant frequency of torsion associated therewith, and the controller may be configured to drive the haptic actuator to the resonant frequency of torsion, for example.

The plurality of coils may include at least four coils, for example. The controller may determine the position of the field member along an x-axis dimension, a z-axis dimension, and a rotational dimension.

The controller may be configured to drive each of the plurality of coils based upon the position of the field member in the plurality of dimensions. The controller may be configured to sense and drive each coil at a same time. The controller may be configured to sense and drive each coil at a different time, for example.

The field member may have opposing first and second sides, and the haptic actuator may further include a respective at least one flexure bearing mounting each of the first and second sides of the field member to be reciprocally movable within the housing responsive to the plurality of coils. The respective at least one flexure bearing may have a wishbone shape.

Each coil may have a racetrack shape. The at least one permanent magnet may include a plurality of permanent magnets, for example.

A method aspect is directed to a method of using a haptic actuator that includes a housing, a plurality of coils carried within the housing, and a field member moveable within the housing between the plurality of coils and including at least one permanent magnet. The method may include using a controller coupled to the plurality of coils and configured to sense a respective back electromotive force (EMF) value of each of the plurality of coils, and determine a position of the field member in a plurality of dimensions based upon the back EMF values and motor constant values.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

Figure 1:
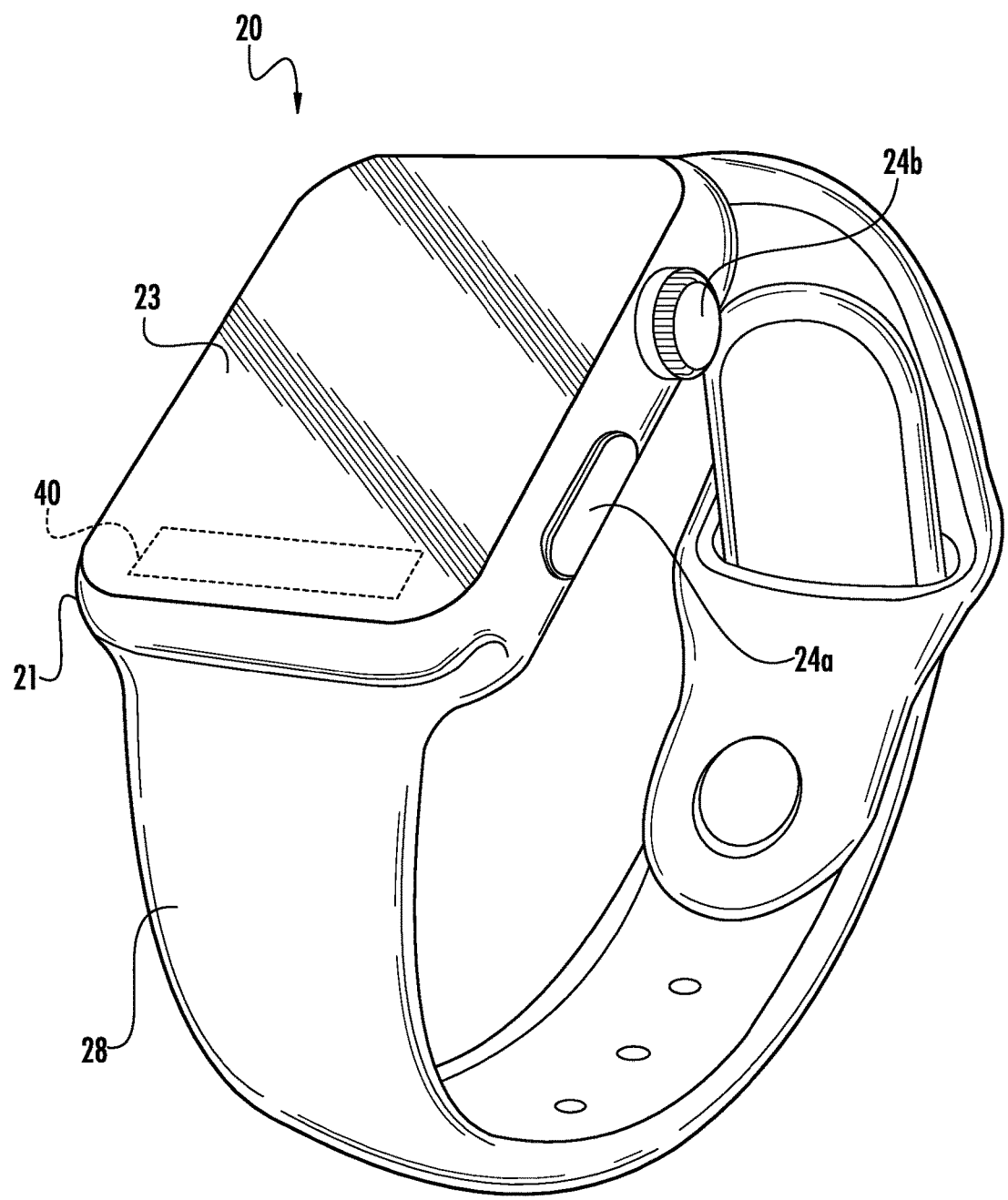
FIG. 1 is a perspective view of an electronic device including a haptic actuator according to an embodiment.
Figure 2:
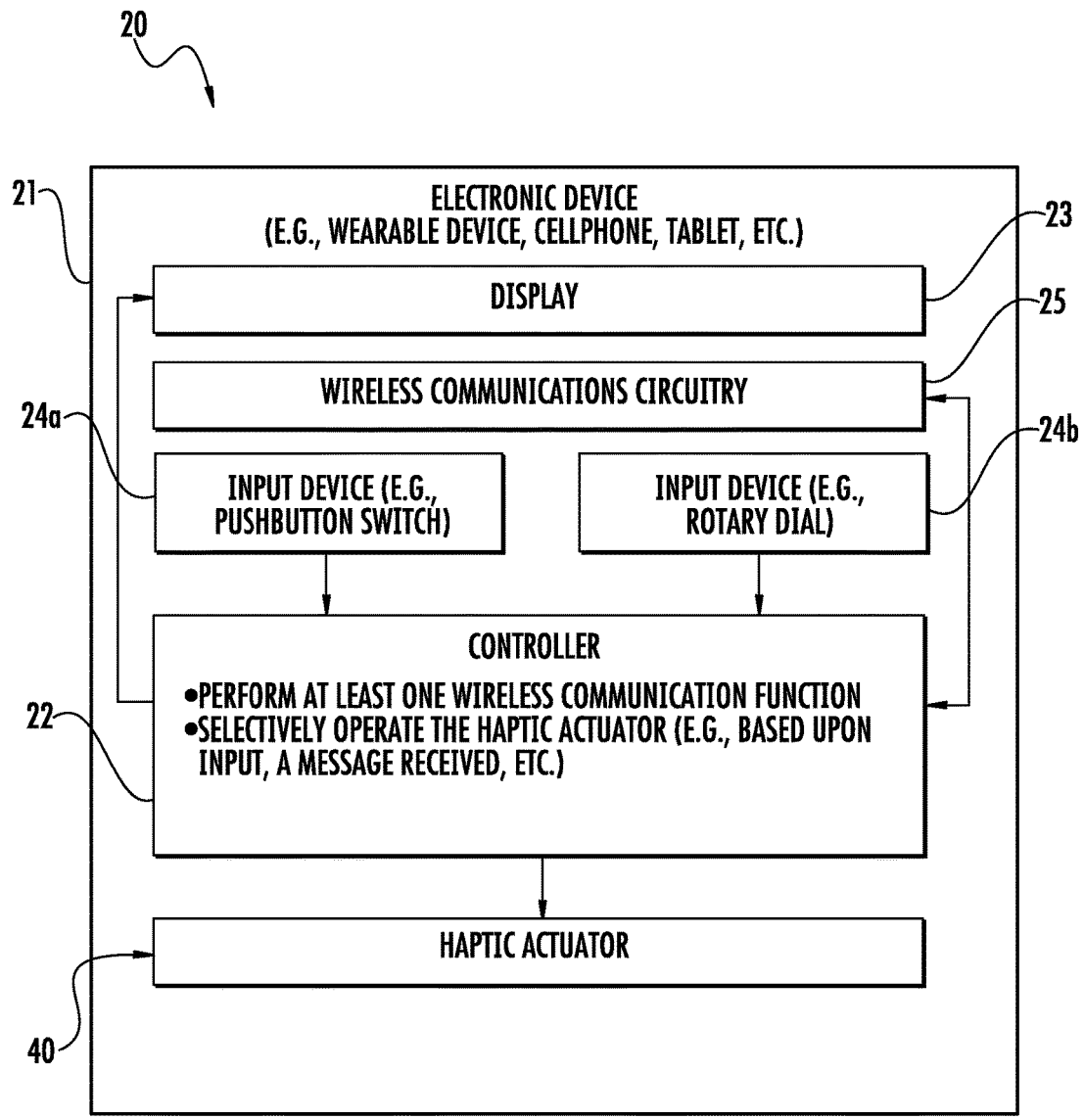
FIG. 2 is a schematic diagram of the electronic device of FIG. 1.
Figure 3:
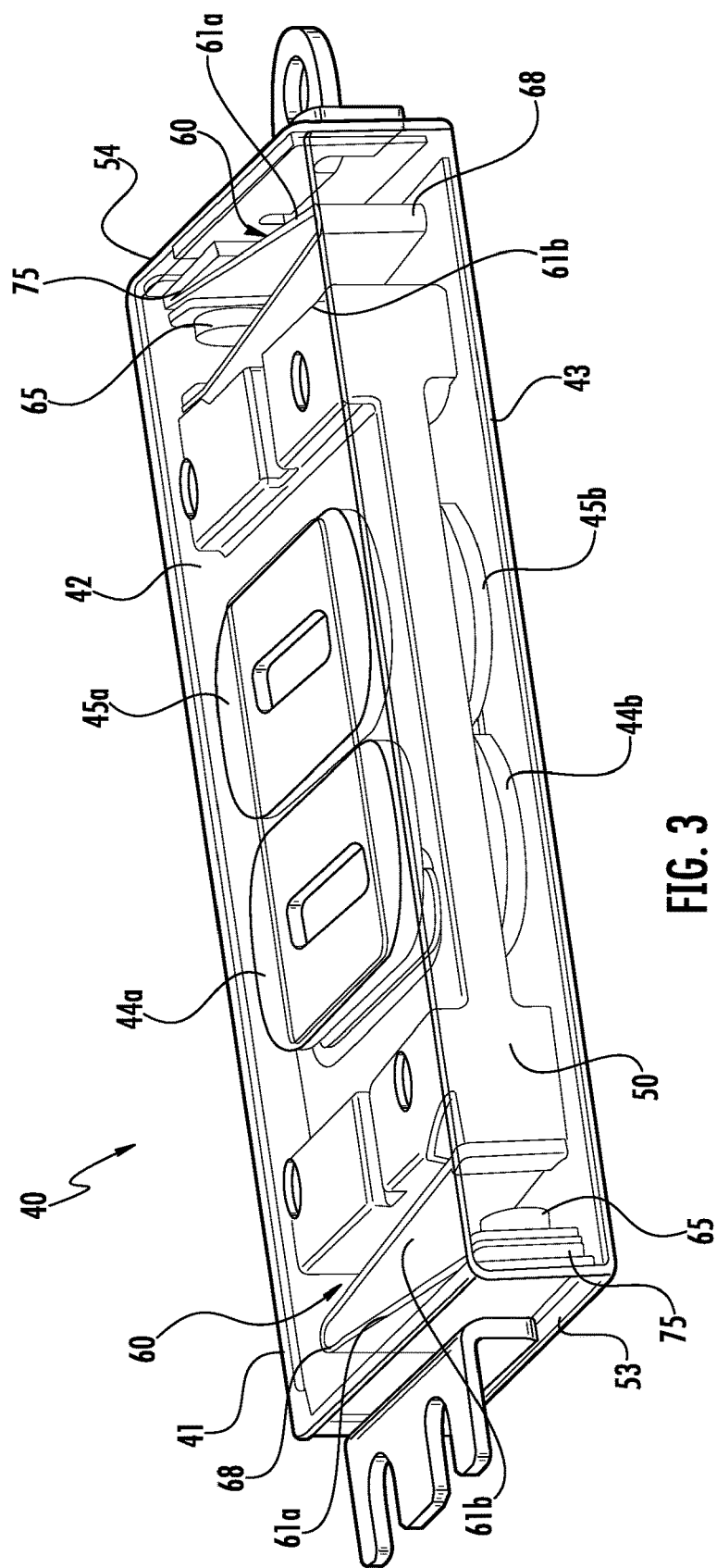
FIG. 3 is a perspective view of a portion haptic actuator according to an embodiment.
Figure 4:
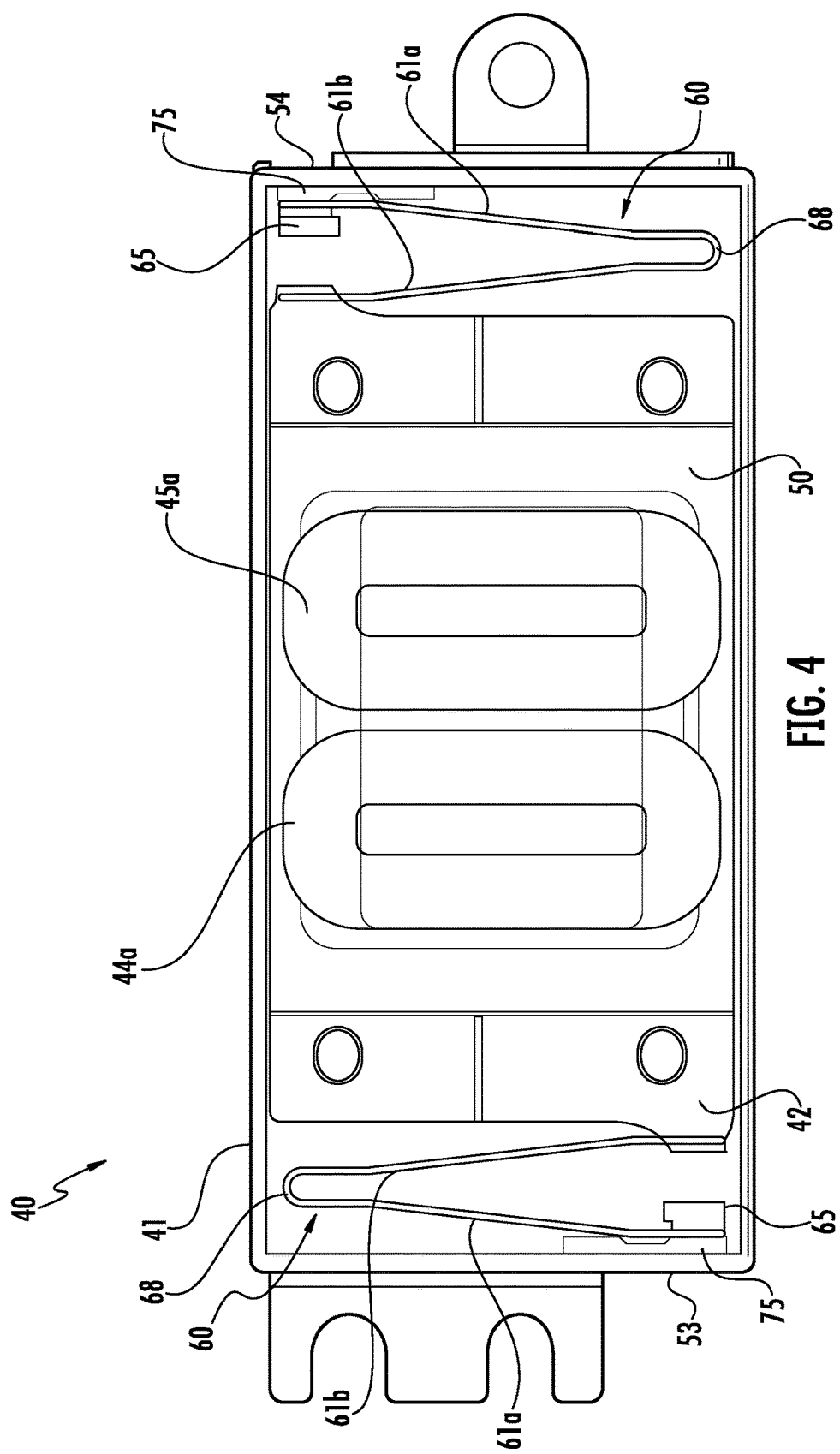
FIG. 4 is a top view of the portion of the haptic actuator of FIG. 3.
Figure 5:
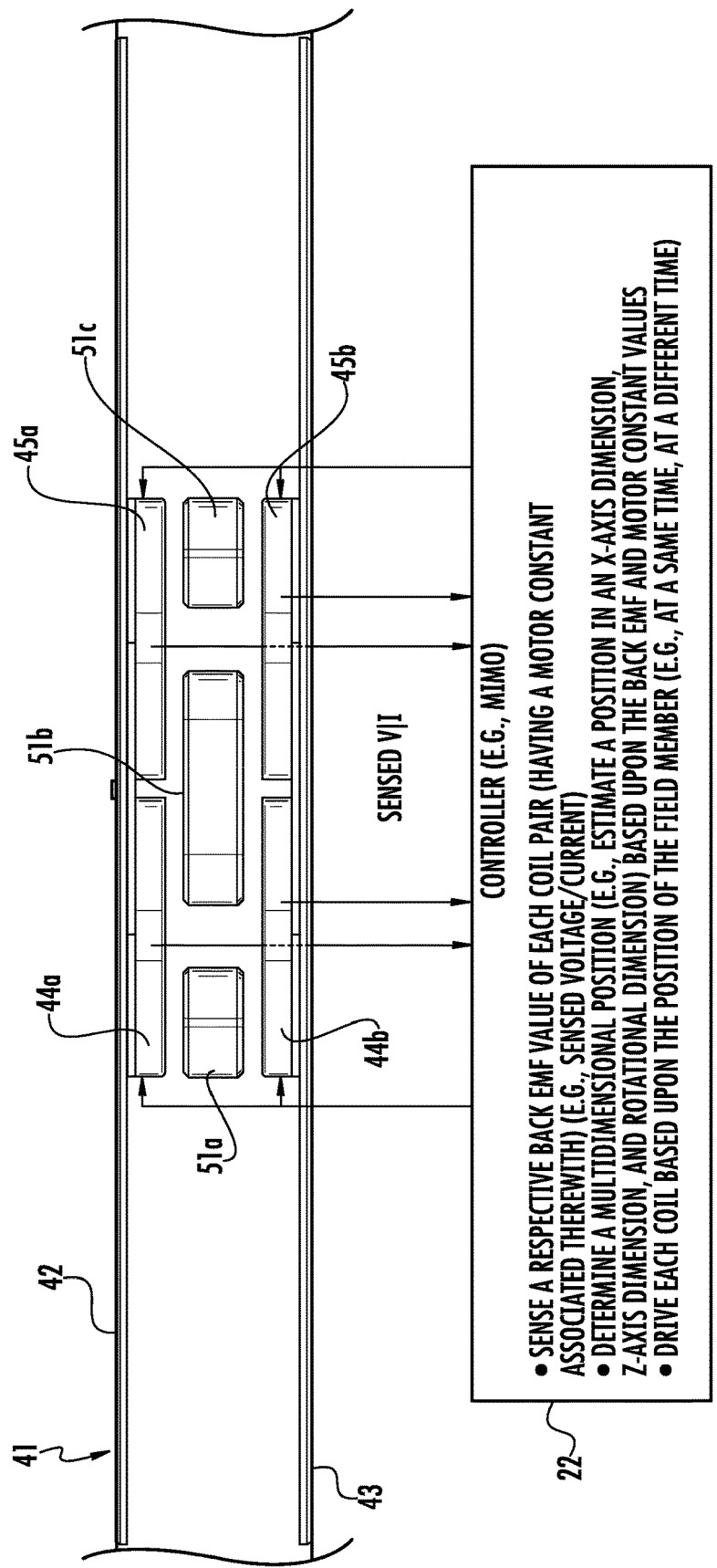
FIG. 5 is a schematic diagram of a portion of a haptic actuator according to an embodiment.
Figure 6:
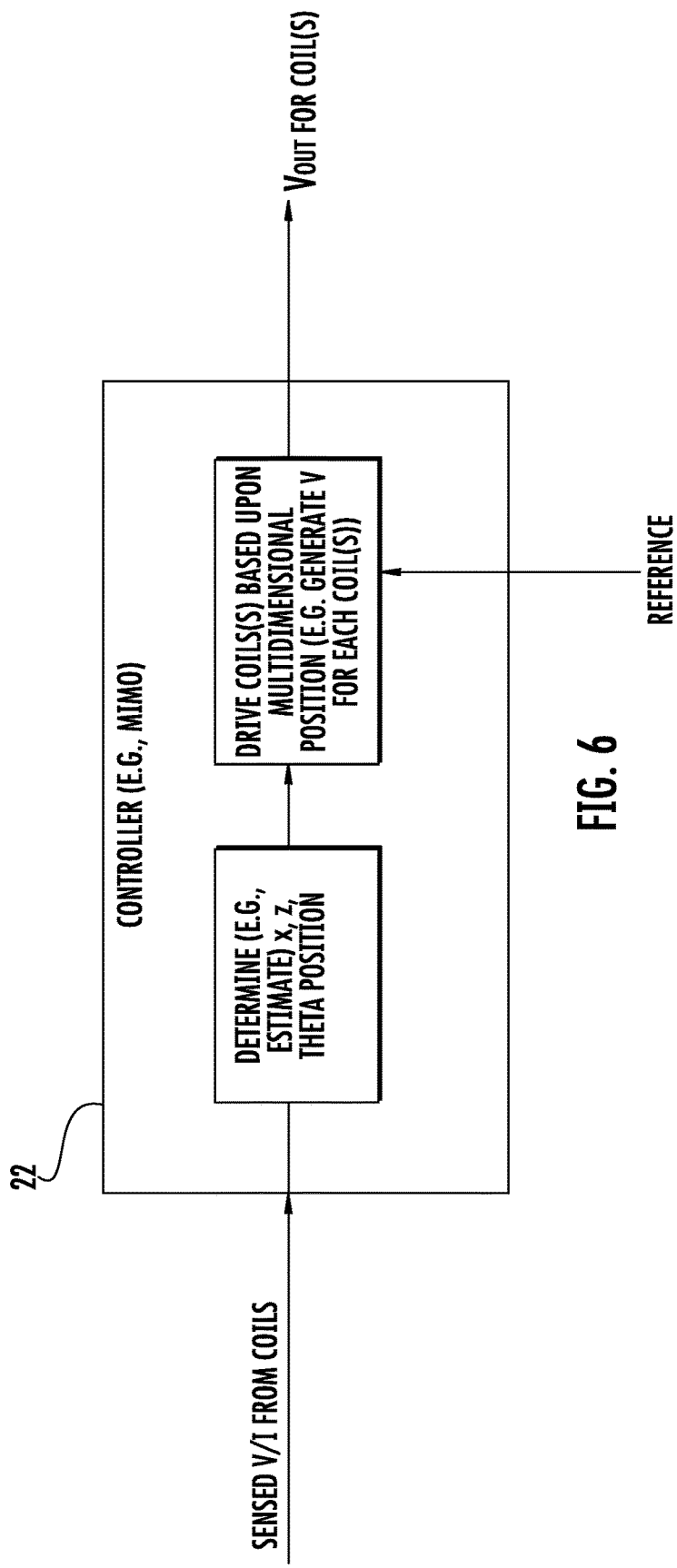
FIG. 6 is a schematic block diagram of operation the controller of FIG. 5

Referring initially to FIGS. 1-2, an electronic device 20 illustratively includes a device housing 21 and a controller 22 carried by the device housing. The electronic device 20 is illustratively a mobile wireless communications device, for example, a wearable wireless communications device, and includes a band 28 or strap for securing it to a user. The electronic device 20 may be another type of electronic device, for example, a cellular telephone, a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be, for example, a liquid crystal display (LCD), light emitting diode (LED) display, or may be another type of display, as will be appreciated by those skilled in the art. The display 23 may be a touch display.

Finger-operated user input devices 24a, 24b, illustratively in the form of a pushbutton switch and a rotary dial are also carried by the device housing 21 and are coupled to the controller 22. The pushbutton switch 24a and the rotary dial 24b cooperate with the controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the controller 22 and provides haptic feedback to the user in the form of relatively long and short vibrations or "taps", particularly when the user is wearing the electronic device 20. The vibrations may be indicative of a message received, and the duration of the vibration may be indicative of the type of message received. Of course, the vibrations may be indicative of or convey other types of information. More particularly, the controller 22 applies a voltage to move a moveable body or masses between first and second positions in a y-axis.

While a controller 22 is described, it should be understood that the controller 22 may include one or more of a processor and other circuitry to perform the functions described herein. For example, the controller 22 may include a class-D amplifier to drive the haptic actuator 40 and/or sensors for sensing voltage and current. In other words, the controller 22 may perform both device and haptic functions. The controller 22 may be considered part of the haptic actuator, for example, carried with the actuator housing 41, and/or remote from the haptic actuator.

Referring now additionally to FIGS. 3-6 the haptic actuator 40 includes an actuator housing 41. The actuator housing 41 illustratively has a dimension in a length direction greater than a width direction. The actuator housing 41 may include ferritic material in portions of or all of the actuator housing. For example, the top 42 and bottom 43 of the actuator housing 41 may be ferritic. Of course other and/or additional portions of the actuator housing 41 may be ferritic. The use of ferritic material in the actuator housing 41 may improve performance, for example.

The haptic actuator 40 also includes coils 44a, 44b, 45a, 45b carried by the actuator housing 41. Illustratively, there are four coils 44a, 44b, 45a, 45b, two top coils and two bottom coils. However, it will be appreciated by those skilled in the art that there may be more than four coils as will be described in further detail below. Each coil pair 44, 45 has a respective motor constant value associated therewith.

Each coil 44a, 44b, 45a, 45b has a loop shape or "racetrack" shape. Of course, each coil 44a, 44b, 45a, 45b may have another shape.

The haptic actuator 40 also includes a field member 50 carried by the actuator housing 41. The field member 50, similarly to the actuator housing 41, has a dimension in a length direction greater than a width direction. Thus, the field member 50 is reciprocally movable in the width direction (i.e., the x-direction). While the movement of the field member 50 is described as being moveable in one direction, i.e., a linear haptic actuator, it should be understood that in some embodiments, the field member 50 may be movable in other directions, i.e., an angular haptic actuator, or may be a combination of both a linear and an angular haptic actuator.

The field member 50 illustratively includes permanent magnets 51a-51c between the top coils 44a, 45a and the bottom coils 44b, 45b. The permanent magnets 51a-51c may be neodymium, for example, and may be positioned in opposing directions with respect to their respective poles.

The permanent magnets 51a-51c may be aligned along a length of the coils 44a, 44b, 45a, 45b. While three shaped permanent magnets 51a-51c are illustrated, it will be appreciated that there may be any number of permanent magnets having any shape between the coils 44a, 44b, 45a, 45b. The permanent magnets 51a-51c may be arranged as a Halbach array. It should be noted that in some embodiments, the first and second coil pairs 44, 45 may be carried by or part of the field member 50, while the permanent magnets are stationary or carried by the actuator housing 41 (i.e., a moving coil configuration).

The haptic actuator 40 also includes respective flexure bearings 60 mounting each of first and second sides 53, 54 of the field member 50 to be reciprocally movable within the actuator housing 41 responsive to the first and second coil pairs 44, 45. Each flexure bearing 60 is illustratively in the shape of a wishbone and includes two diverging arms 61a, 61b, joined together at proximal ends by a bend 68. The two diverging arms 61a, 61b each have spaced distal ends that are operatively coupled between adjacent portions of the field member 50 and the actuator housing 41 by way of respective anchor members 75 coupled to an adjacent portion of the actuator housing, and more particularly, adjacent an end and a side (i.e., a corner) of the actuator housing. In some embodiments, each flexure bearing 60 may not be in a wishbone shape, but may have another shape.

The two diverging arms 61a, 61b may include steel, titanium, and/or copper. The two diverging arms 61a, 61b may include other and/or additional materials. Each flexure bearing 60 also includes a spacer member 65 between the proximal ends of the two diverging arms 61a, 61b.

Further details of the controller 22 and operation of the haptic actuator 40 will now be described. The controller 22 is coupled to the coils 44a, 44b, 45a, 45b and senses a respective back electromotive force (EMF) value of each of the coils.

The controller 22 determines a position of the field member 50 in multiple dimensions based upon the back EMF values and motor constant values. More particularly, the controller 22 may determine the position of the field member 50 along the x-axis dimension, the z-axis dimension, and a rotational dimension (x, z, theta).

The controller 22 may estimate a velocity of the field member 50 based upon the back EMF values and motor constant values and determine the position of the field member based upon the velocity. The controller 22 may also drive the coils 44a, 44b, 45a, 45b based upon the position of the field member 50 in each of the dimensions (e.g., x, y, theta), for example, based upon references, to more closely achieve a desired positional driving. The controller 22 may sense and drive each coil 44a, 44b, 45a, 45b at a same time or a different time based upon the sensed position in the multiple dimensions. To determine the position of the field member 50 in multiple dimensions, the controller 22 may be configured to access each of the coils 44a, 44b, 45a, 45b individually or any subset or sub-combination thereof to sense the back EMF and motor constant values. Similarly, the controller 22 may drive different combinations of the coils 44a, 44b, 45a, 45b with different relative amounts of current to achieve desired forces in the x-axis dimension, z-axis dimension, and rotational dimension (theta).

Accordingly, the above-described sensing and determining may be considered a multiple-input, multiple-output (MIMO) estimation and control of the field member 50. As will be appreciated by those skilled in the art, by combining respective position-dependent (x, z, theta) back-EMF and motor constant values, the position of the field member 50 may more accurately be extracted.

A method aspect is directed to a method of using a haptic actuator 40 that includes an actuator housing 41, coils 44a, 44b, 45a, 45b carried within the housing, and a field member 50 moveable within the housing between the coils and that includes at least one permanent magnet 51a-51c. The method includes using the controller 22 to sense a respective back electromotive force (EMF) value of each of the plurality of coils and determine a position of the field member in a plurality of dimensions based upon the back EMF values and motor constant values.

Figure 7:
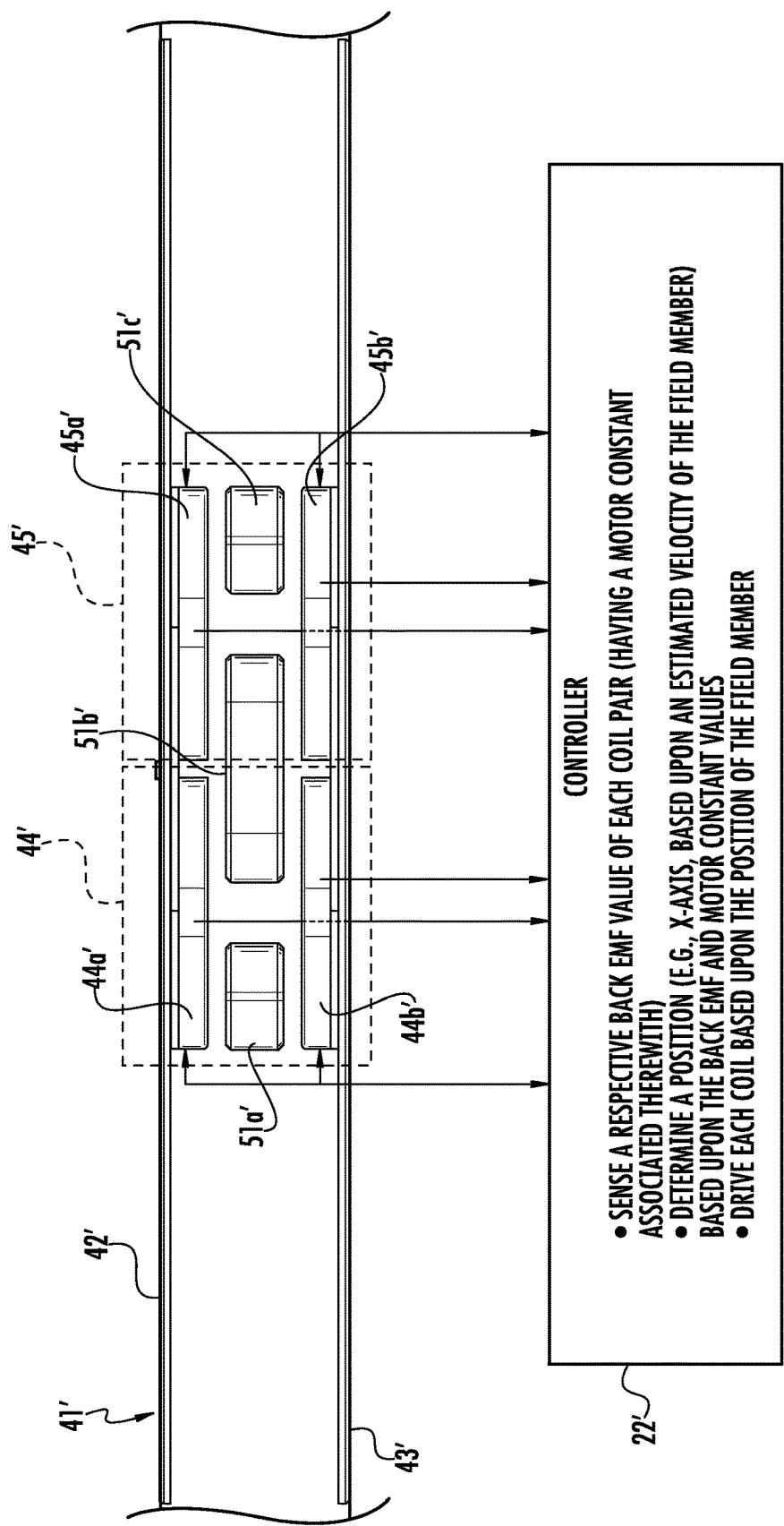
FIG. 7 is a schematic diagram of a portion of a haptic actuator according to another embodiment.

Referring now additionally to FIG. 7 the haptic actuator 40' includes first and second coil pairs 44', 45' carried by the actuator housing 41'. Each coil pair 44', 45' includes top and bottom opposing coils 44a'-44b', 45a'-45b'. Each coil 44a'-44b', 45a'-45b' illustratively has a loop shape or "racetrack" shape. Of course, each coil 44a'-44b', 45a'-45b' may have another shape. Moreover, while first and second coil pairs 44', 45' are shown, it will be appreciated that there may be more than two coil pairs. Each coil pair 44', 45' has a respective motor constant value associated therewith. The pairing of the coils 44a', 44b', 45a', 45b' may advantageously provide increased efficiency and/or accuracy field member 50' position determination.

Further details of the controller 22' and operation of the haptic actuator 40' will now be described. The controller 22' is coupled to the coil pairs 44', 45' and senses a respective back electromotive force (EMF) value of each coil pair.

The controller 22' determines a position (e.g., in the x-axis direction) of the field member 50' based upon the back EMF values and motor constant values. More particularly, the controller 22' may estimate a velocity of the field member 50' based upon the back EMF values and motor constant values and determine the position of the field member based upon the velocity. The controller 22' may also drive each coil pair 44', 45' based upon the position of the field member 50'.

As will be appreciated by those skilled in the art, in the present embodiment, the motor constants of the left coils 44a', 44b' and right coils 45a', 45b' are separated out. The motor constant of the paired coils 44a'-44b', 45a'-45b' (i.e., left v. right) are independent of z-axis movement, even near dx=0. Thus a relationship, for example, the motor constant ratio may be used as an increasingly accurate estimation of x-axis position. In particular, through back EMF and the motor constant, x-axis velocity can be estimated as $V_{backEMF} = K_m \dot{x}$. In other words, by sensing from the left and right coil pairs 44a'-44b', 45a'-45b' individually, the impact of z-axis displacement may be greatly reduced as the z-axis offset is decoupled.

Figure 8:
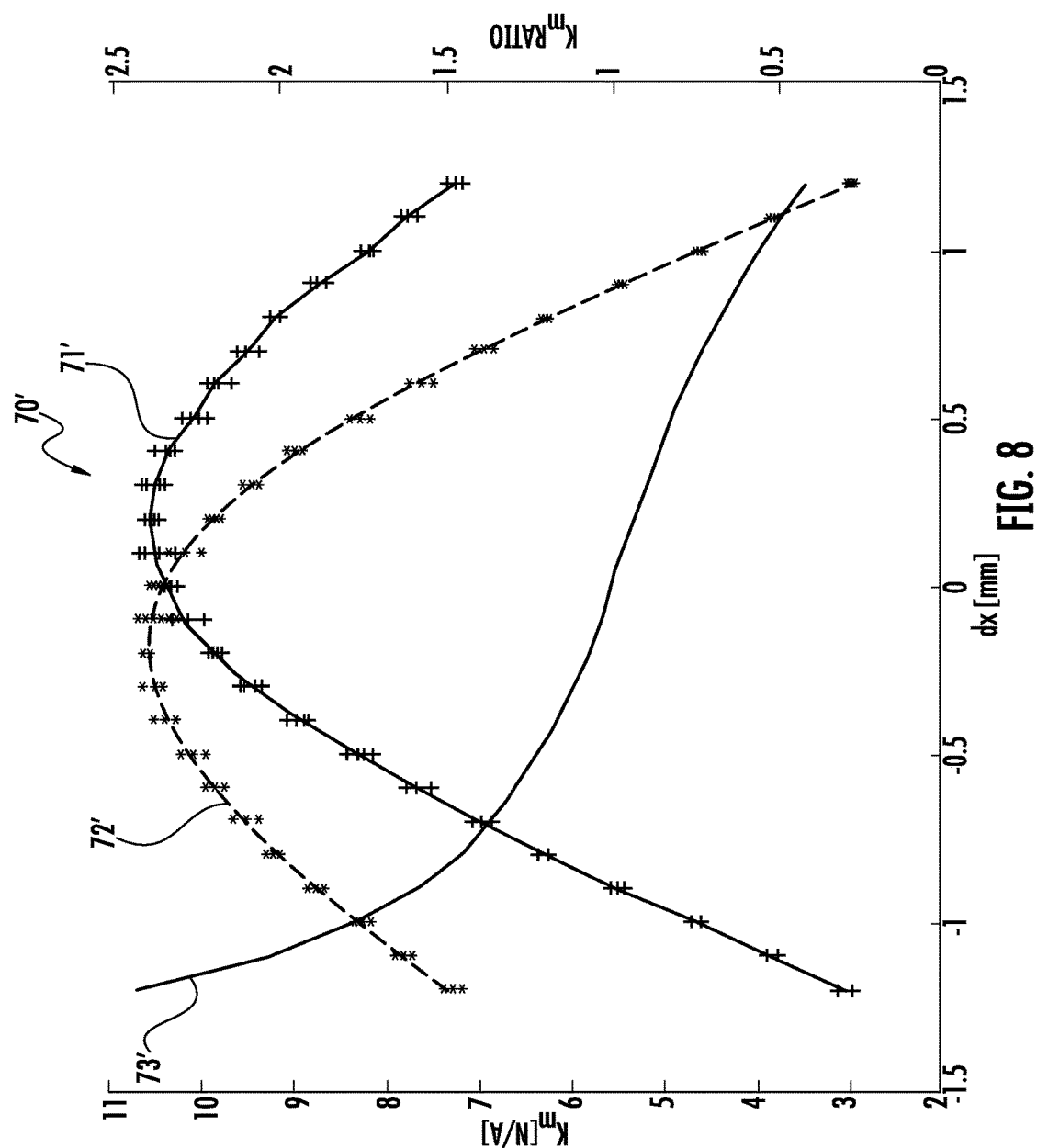
FIG. 8 is a graph of simulated motor constants for the left and right coils of the haptic actuator of FIG. 7.

Referring now to the graph 70' in FIG. 8, the motor constants, $K_m$, of the left 44a'-44b' and right 45a'-45b' coil pairs is illustrated. The "+" signs correspond to the right coils 45a'-45b', dz=[−0.2:0.1:0.2] and the "*" corresponds to the left coils 44a'-44b', dz=[−0.2:0.1:0.2]. Line 71' corresponds to $K_m$ of the right coils 45a'-45b' and line 72' corresponds to the $K_m$ of the left coils 44a'-44b', and line 73' corresponds to the $K_m$ ratio (L/R).

The graph 70' indicates an opportunity to optimize module drive by adjusting the amount of current in the left and right coils 44a'-44b', 45a'-45b' based upon x-axis displacement. For example, assuming constant power and uniform coil resistance, an optimal current ratio between the left and right coil pairs 44a'-44b', 45a'-45b' may be found increasing engine efficiency towards the edge of travel accordingly. In other words, if a determination is made as to the position of the module or field member 50' at any given moment, the contributions of each coil pair can be determined, and current to left or right coil pairs 44a'-44b', 45a'-45b' may be adjusted for improvement. Exemplary illustrative equations are as follows:

$$I_L = \sqrt{P - I_R^2} \; \alpha = \frac{K_L}{K_R}$$

$$I_R = \sqrt{\frac{P}{1 + \alpha^2}}$$

$$F_{total} = K_R \left( \alpha \sqrt{P - I_R^2} + I_R \right)$$

-continued $$\frac{dF_{total}}{dI_R} = K_R \left(1 - \alpha \frac{I_R}{\sqrt{P - I_R^2}}\right)$$

Figure 9:
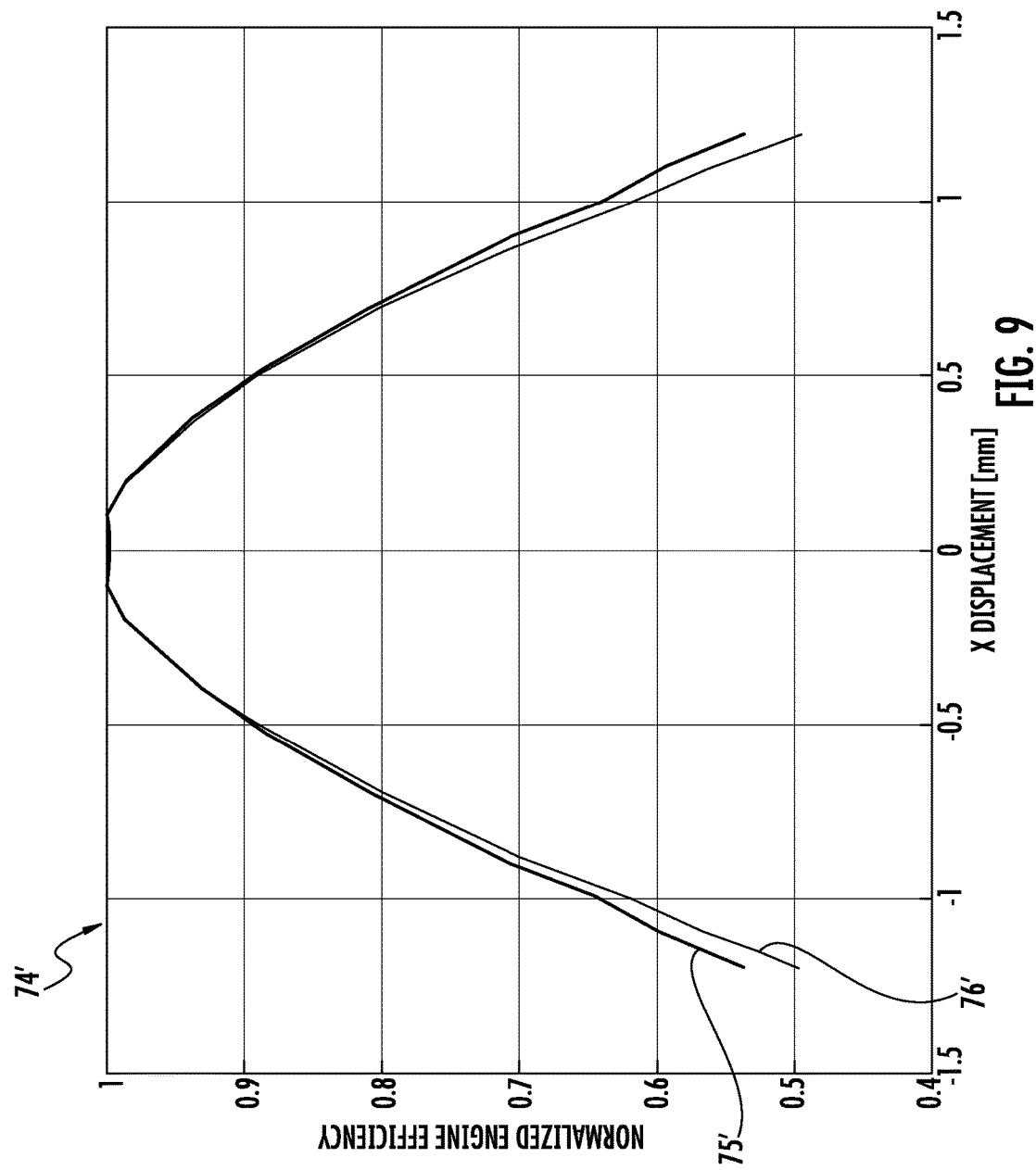
FIG. 9 is a graph of simulated engine efficiency for the haptic actuator of FIG. 7.
Figure 10:
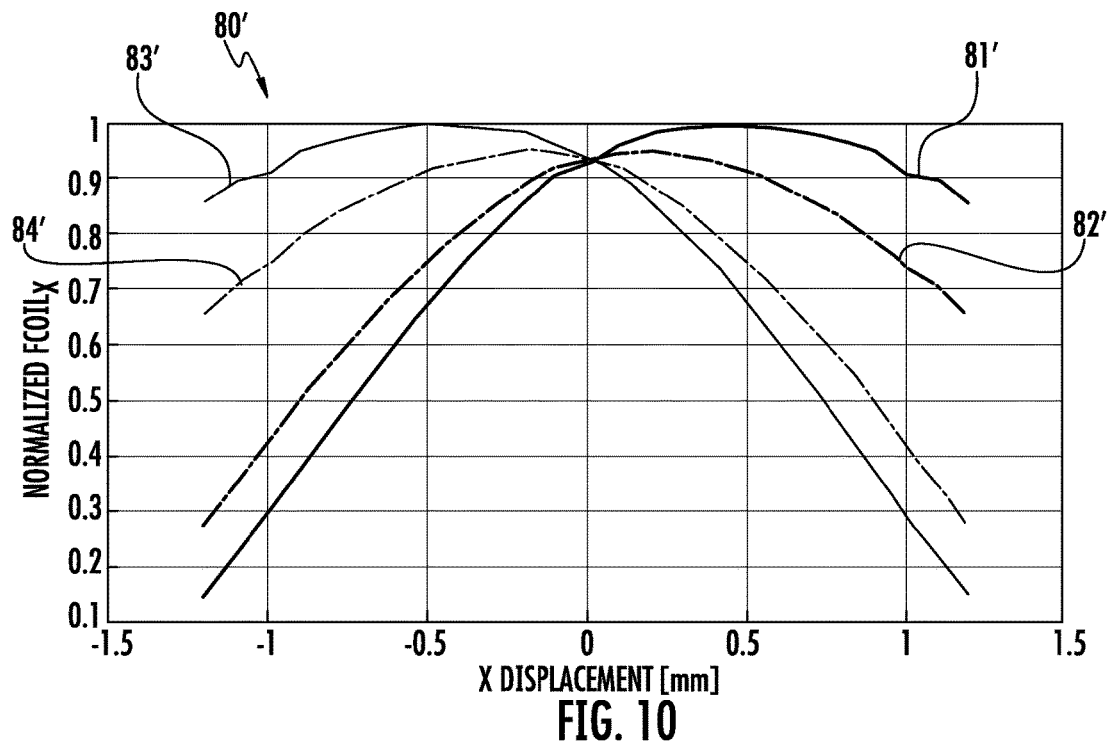
FIG. 10 is a graph of simulated coil force for the left and right coils of the haptic actuator of FIG. 7.
Figure 11:
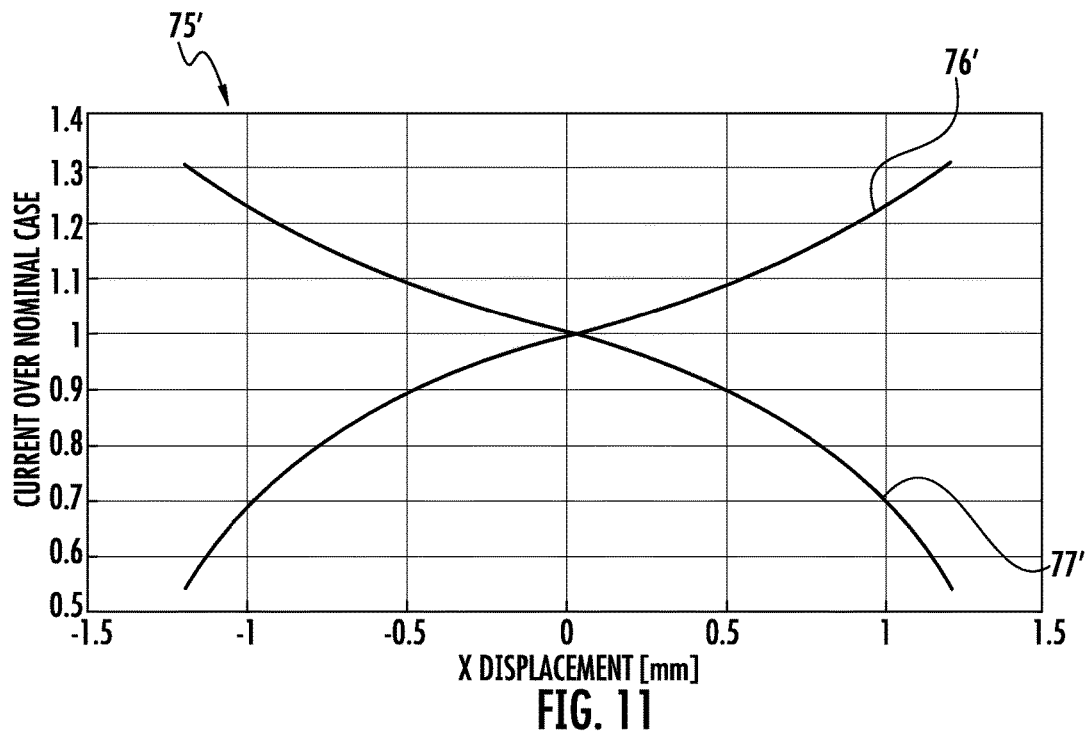
FIG. 11 is a graph of simulated input current for the haptic actuator of FIG. 7.

The graph 74' in FIG. 9 illustrates engine efficiency, with line 75' indicating optimal engine efficiency, and line 76' indicating engine efficiency for the same nI. The graph 80' in FIG. 10 illustrates left and right coil force with lines 81' corresponding to optimal force for the right coils 45a'-45b', 82' corresponding to the same nI for the right coils, 83' corresponding to the optimal force for the left coils 44a'-44b', and 84' corresponding to the same nI for the left coils. The graph 75' in FIG. 11 illustrates input current relative to equal nI with line 76' indicating the current over the nominal case for the right coils 45a'-45b' and line 77' indicating the current over the nominal case for the left coils 44a'-44b'.

A method aspect is directed to a method of operating a haptic actuator 40' that includes a housing 41' having a top 42' and bottom 43', and coil pairs 44', 45' carried within the housing. Each coil pair 44', 45' includes top and bottom opposing coils 44a'-44b', 45a'-45b' and each coil pair has a respective motor constant value associated therewith. The haptic actuator 40' includes a field member 50' being moveable within the housing 41' between the coil pairs 44', 45' and includes at least one permanent magnet 51a'-51c'. The method includes using a controller 22' coupled to the coil pairs 44', 45' to sense a respective back EMF value of each coil pair, and determine a position of the field member 50' based upon the back EMF values and motor constant values.

Figure 12:
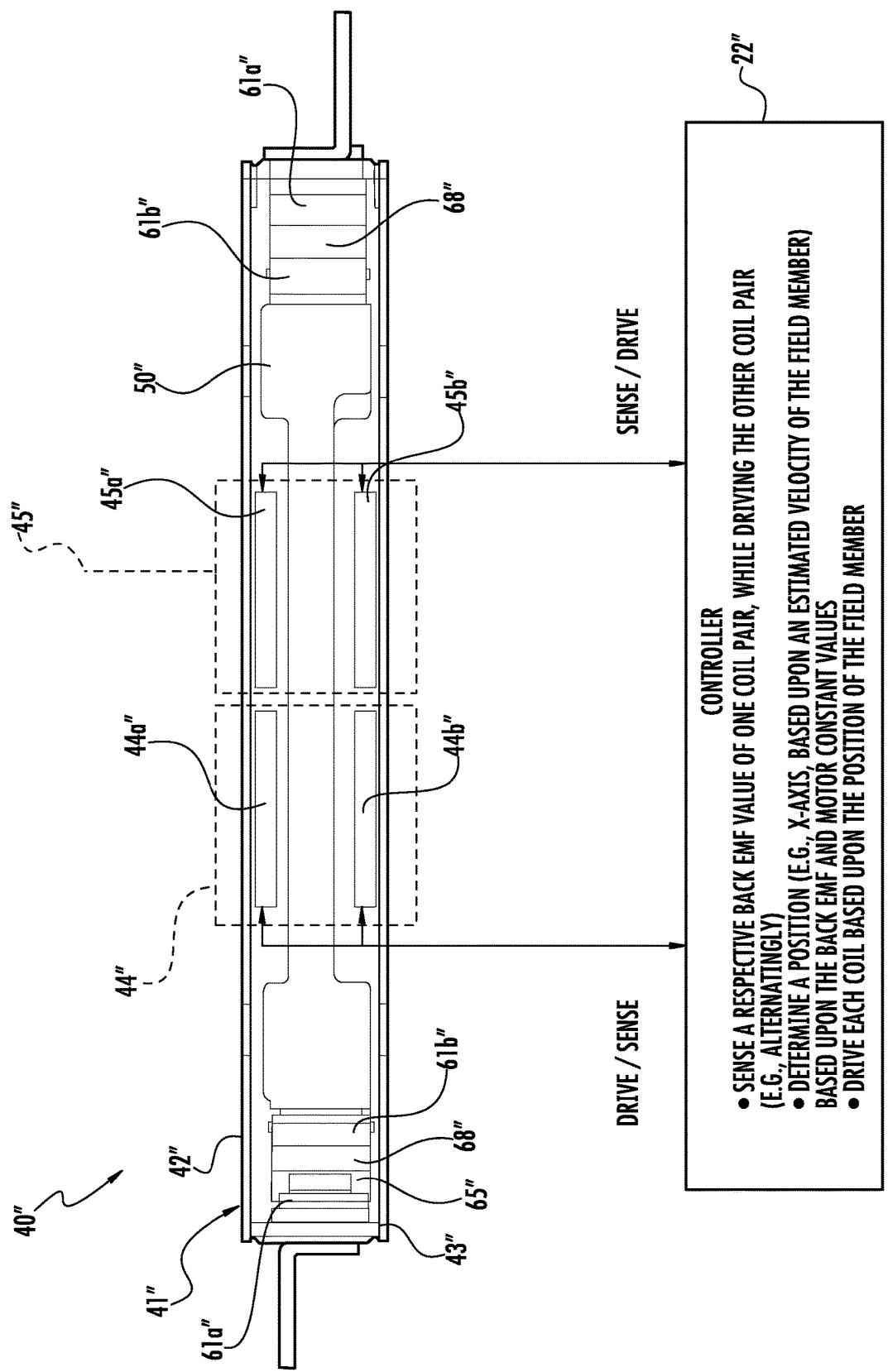
FIG. 12 is a schematic diagram of a portion of a haptic actuator according to another embodiment.

Referring now to FIG. 12 in another embodiment, the controller 22" is configured to sense a respective back EMF value of one coil pair 44a"-44b" while driving the other coil pair 45a"-45b". There may be more than two coil pairs, which may be driven and/or sensed individually or in groupings.

In some embodiments, the controller 22" may alternatingly sense the respective back EMF value of the one coil pair 44a"-44b" while driving the other coil pair 45a"-45b", and drive the coil pair while sensing a respective back EMF value of the other coil pair. In other words, the sensing and driving may be time multiplexed. The coil pairs 44", 45" may each have a respective motor constant value associated therewith, and the controller 22" may determine the position (e.g., x-axis position and based upon estimated velocity).

As will be appreciated by those skilled in the art, in a single-phase haptic actuator (e.g., a linear actuator), the voltage ($V_{mon}$) and the current ($I_{mon}$) thereof may be monitored, and subsequently, the back EMF voltage (and estimated velocity) may be calculated using the circuit model. The calculated back EMF voltage may be a relatively strong function of the coil resistance (which may drift with temperature) especially in high current mode (e.g., when driving off resonance). Hence, the accuracy of the velocity estimation may be a relatively strong function of the accuracy of the current and voltage, analog-to-digital converters, and real-time resistance estimation. Alternatively, given a relatively accurate estimation of position, it may be desirable to drive the haptic actuator 40" using a subset of coils (i.e., less than all the coils) and use the remaining coils purely for sensing purposes, and then alternate the drive and sensing coils to achieve a smoother response and to estimate the phase in real-time. Because the sensing coils typically have zero current, the monitored voltage is mainly due to back EMF and therefore omits current monitoring and real-time resistance tracking, as will be appreciated by those skilled in the art.

A method aspect is directed to a method of operating a haptic actuator 40" that includes a housing 41" having a top and bottom 42", 43" and coil pairs 44", 45" carried within the housing. Each coil pair 44", 45" includes top 44a", 45a" and bottom 44b", 45b" opposing coils. A field member 50" is moveable within the housing 41" between the coil pairs 44", 45". The field member 50" includes at least one permanent magnet 51a"-51c". The method includes using a controller 22" coupled to the coil pairs 44", 45" to sense a respective back EMF value of one coil pair while driving the other coil pair. Elements illustrated, but not specifically described, are similar to those described above with respect to FIGS. 3-5.

Figure 13:
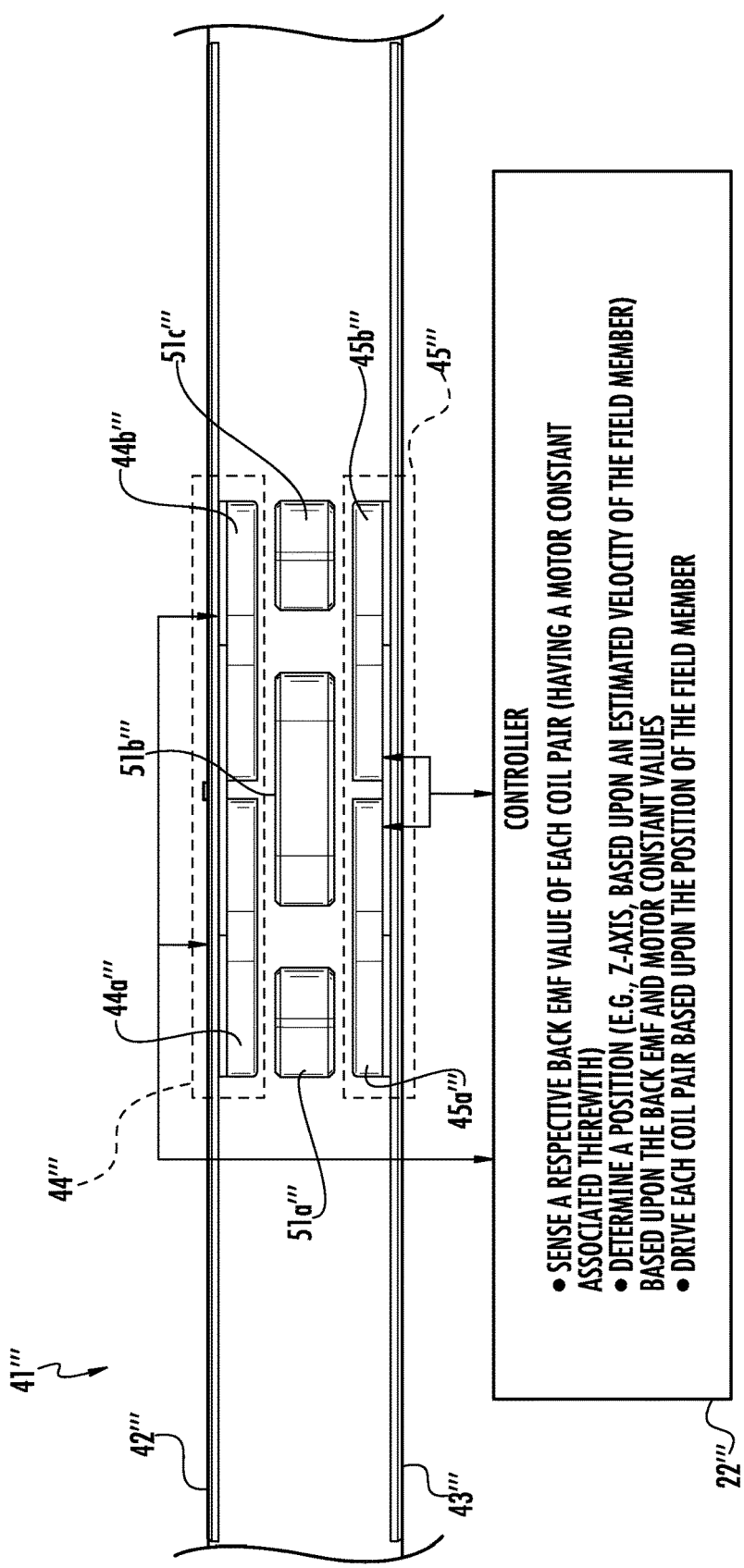
FIG. 13 is a schematic diagram of a portion of a haptic actuator according to another embodiment.

Referring now to FIG. 13, in another embodiment, a haptic actuator 40''', similar to the haptic actuators described above, illustratively includes a housing 41''' having a top 42''' and bottom 43''' and first and second coil pairs 44''', 45''' carried within the housing. Each coil pair 44''', 45''' includes left and right opposing coils 44a'''-44b''', 45a'''-45b''', and each coil pair has a respective motor constant value associated therewith. A field member 50''' is movable within the housing 41''' and includes permanent magnets 51a'''-51c'''.

A controller 22''' is coupled to the coil pairs 44''', 45''' and is configured to sense a respective back EMF value of each coil pair. The controller 22''' also determines a position of the field member 50''' (e.g., z-axis position) based upon the back EMF values and motor constant values. The controller 22''' also drives each coil pair 44''', 45''' based upon the position or estimated velocity of the field member 50'''.

As will be appreciated by those skilled in the art, activating just the top coils 44a'''-44b''' or bottom coils 45a'''-45b''', z-axis direction force may be generated, particularly further along the x-axis path of travel. Z-axis force along with the x-axis and z-axis positions may be used to reduce or cancel out undesirable motion in z-axis. The motor constants of the paired top and bottom coils 44a'''-44b''', 45a'''-45b''' are dependent on both x-axis and z-axis position. However, given an x-axis position, the z-axis position can be estimated with relative precision.

Figure 14:
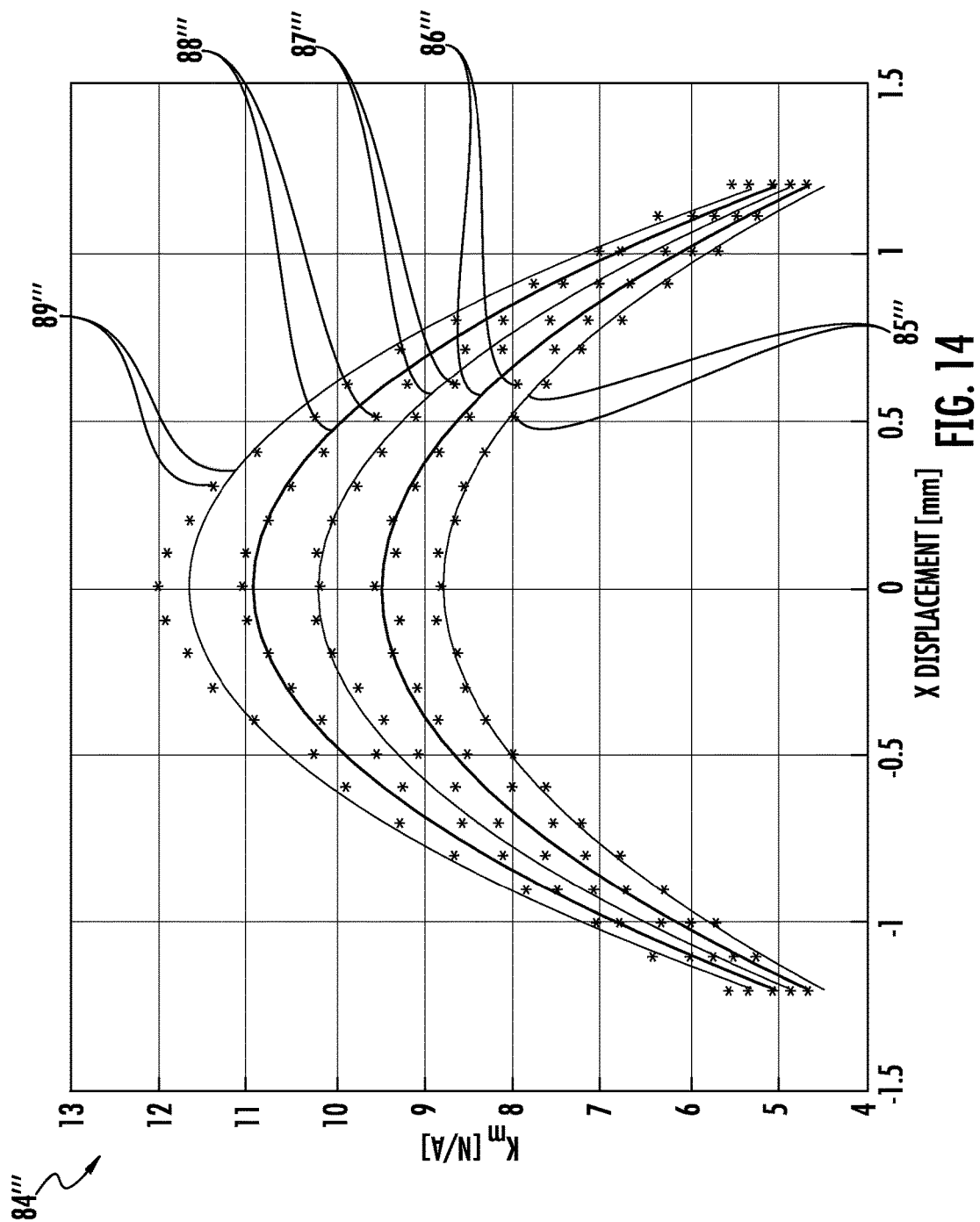
FIG. 14 is a graph of simulated motor constants for the upper coils of the haptic actuator of FIG. 13.
Figure 15:
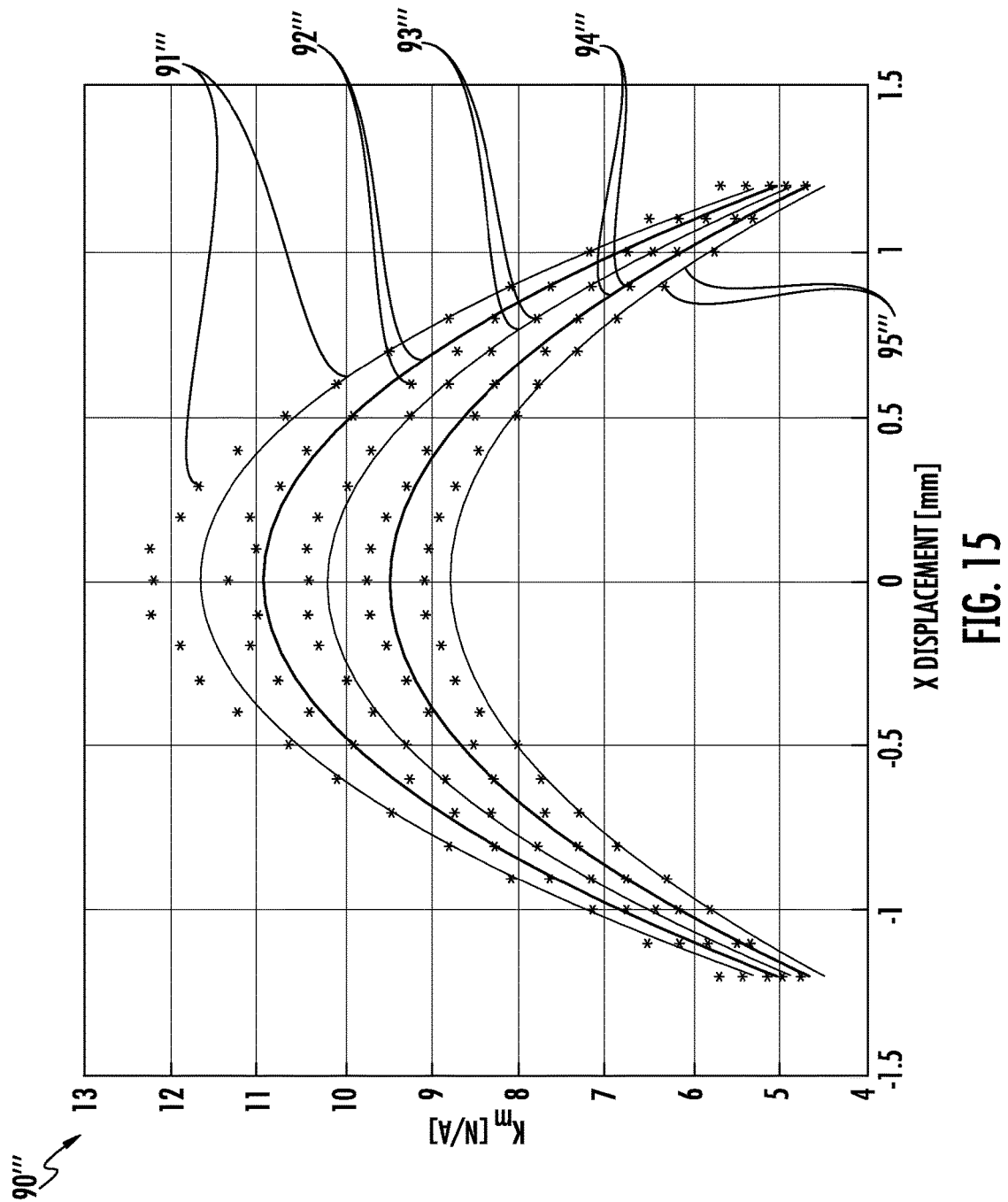
FIG. 15 is a graph of simulated motor constants for the lower coils of the haptic actuator of FIG. 13.

Referring now additionally to the graph 84''' in FIG. 14, $K_m$ of the upper coils 44''' is illustrated with the lines (and *s) 85''', 86''', 87''' 88''' and 89''' corresponding to dz=−0.2, dz=−0.1, dz=0, dz=0.1, and dz=0.2, respectively. The graph 90''' in FIG. 15, $K_m$ of the lower coils 45''' is illustrated with the lines (and *s) 91''', 92''', 93''' 94' and 95''' corresponding to dz=−0.2, dz=−0.1, dz=0, dz=0.1, and dz=0.2, respectively Corresponding equations are as follows:

$$K^U = \frac{1}{2}*((20.5+14dz)-7.5(1+dz)dx^2)|$$

$$K^B = \frac{1}{2}*((20.5-14dz)-7.5(1-dz)dx^2)|$$

Figure 16:
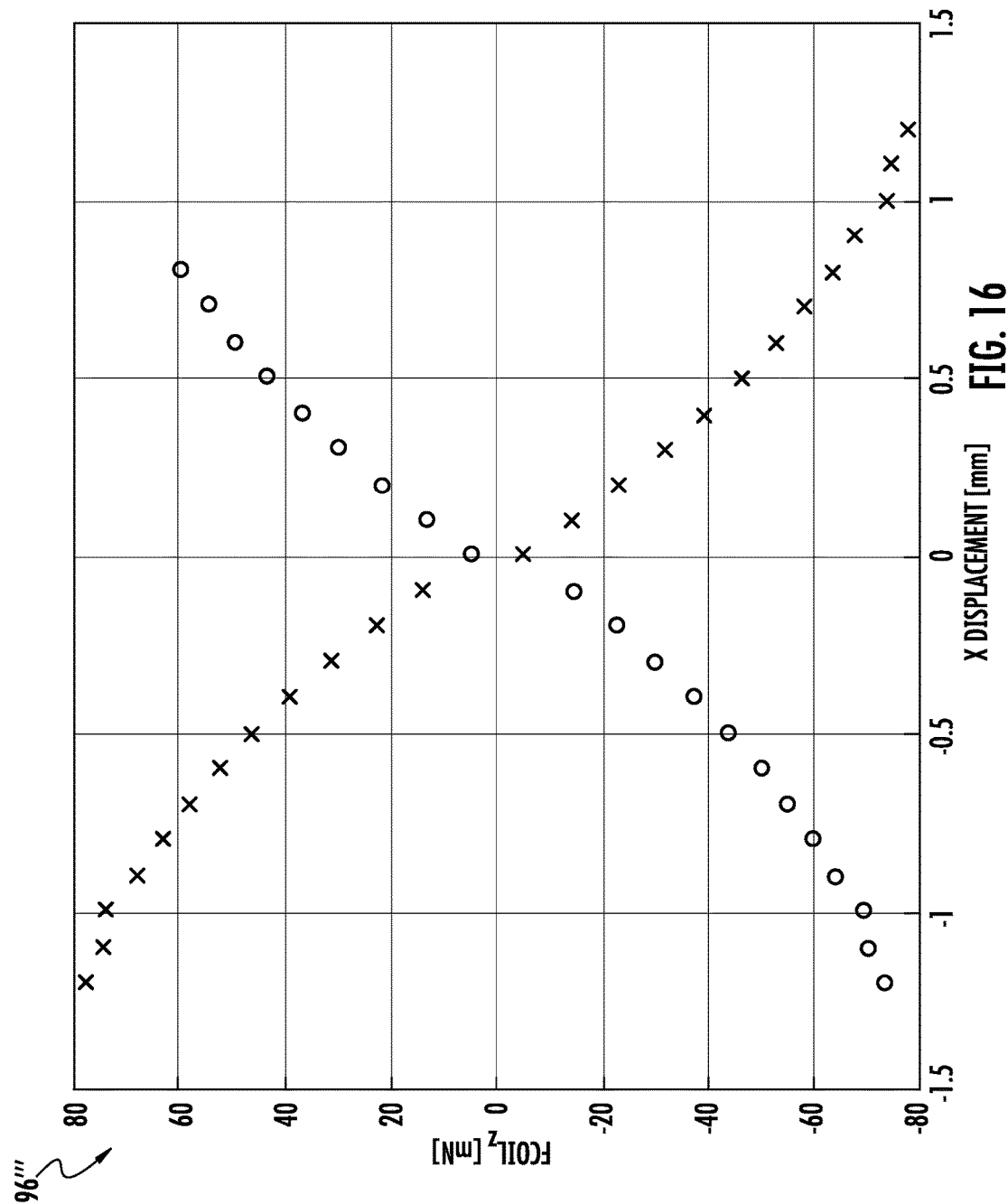
FIG. 16 is a graph of simulated z-axis force for the coils of the haptic actuator of FIG. 13.

Referring now additionally to the graph 96''' in FIG. 16, the z-axis force in each coil pair 44''', 45''' is illustrated, with the "x" corresponding to the bottom coils 45a'''-45b''' and the "o" corresponding to the top coils 44a'''-44b'''. Elements illustrated, but not specifically described, are similar to those described above.

A method aspect is directed to a method of operating a haptic actuator 40''' that includes a housing 41''' having a top 42''' and bottom 43''', and a plurality of coil pairs 44''', 45''' carried within the housing, wherein each coil pair includes left and right opposing coils 44a'''-44b''', 45a'''-45b''', and wherein each coil pair has a respective motor constant value associated therewith. A field member 50''' is moveable within the housing 41''' between the plurality of coil pairs 44''', 45''' and includes at least one permanent magnet 51a'''-51c'''. The method includes using a controller 22''' coupled to the coil pairs 44''', 45''' to sense a respective back EMF value of each coil pair, and determine a position of the field member based upon the back EMF values and motor constant values.

Accordingly, it will be appreciated by those skilled in the art that a separate position sensor (e.g., a Hall Effect sensor), which provides velocity from a single back EMF measurement may be undesirable in a haptic actuator. Moreover while integrated velocity may obtain position, it may introduce error, which may be undesirable. Some prior art haptic actuators may exhibit signs of nonlinearity, as $K_m$ is position dependent, thus adding inaccuracy to a velocity estimate. While a Hall Effect sensor may provide an x-axis position estimate, it may be increasingly sensitive to z-axis offset. Thus, to meaningfully decouple the impact of z-axis offset, a second Hall Effect sensor may be desirable. However, this too may be undesirable as it occupies additional space within the actuator housing.

By sensing and driving coils or coil pairs 44, 45 individually, coil-specific back EMF may be measured. Combining back EMF readings may reduce or cancel the effects of z-axis offset, allowing for a z-axis independent position sensing, while also providing a more accurate velocity reading. Still further, a system that exhibits more accurate estimation of position and velocity can be built using sensor fusion techniques such as, for example, a Kalman filter. Even in a single phase design with two coils serially connected, sensing between the two coils will provide separate back EMF of the two coils, thus allowing for similar sensing.

With respect to actuation, in current state of the art haptic actuators, all coils are driven through the same pins or electrical connections, for example. This may result in a singular drive mode (e.g., x-axis direction). Any desired waveforms may all be dependent on the same x-axis resonant frequency. Thus, any waveforms with frequencies significantly higher or lower than the resonant mode will typically have lower efficiency. Furthermore, current state of the art haptic actuators have non-x-axis modes at higher frequencies. These modes are currently seen as including risk factors, which may cause noise and related failures if excited. By driving coils individually, the haptic actuator 40 may be driven in the z-axis direction, torque induced, and driving efficiency increased.

The ability to sense or determine a relatively accurate estimate on z-axis offset makes it possible to determine undesirable motion. By changing the relative phase of different coils (e.g., by driving top coils out of phase relative to bottom coils), these undesirable motions may be reduced or mitigated. Additionally, by inducing torque by driving the coils in opposite directions may permit another or secondary alert or notification type. Instead of x-axis direction motion, it may be possible to achieve a higher frequency torque mode. However, because this would also be on-resonance, the haptic actuator would typically be more efficient in this mode as well. Accordingly, given knowledge of x-axis position, it is possible to drive the haptic actuator using just one set of coils and using the other to understand position, or to allocate current optimally for higher efficiency.

Figure 17:
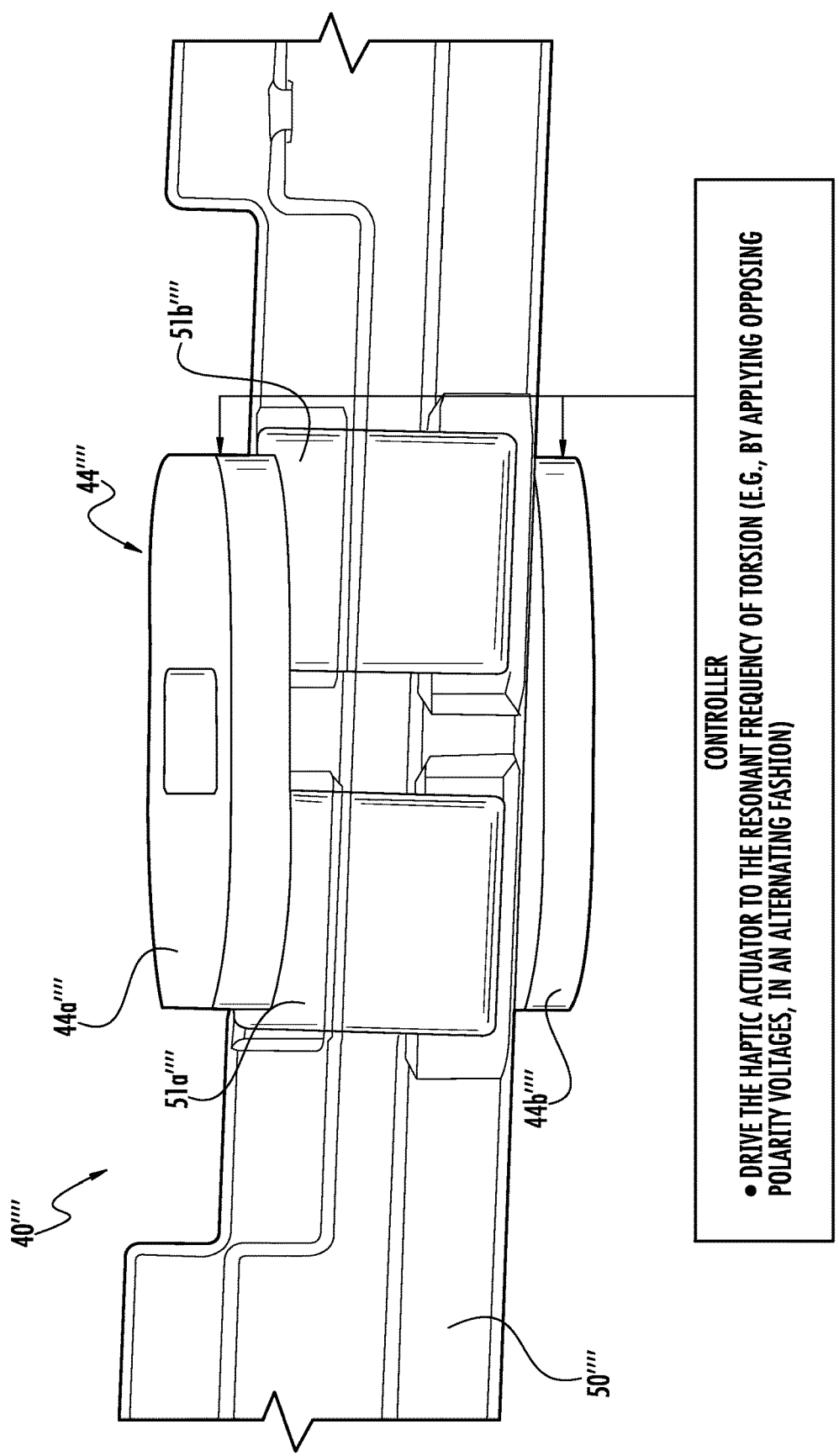
FIG. 17 is a perspective view of a portion of a haptic actuator according to another embodiment.
Figure 18:
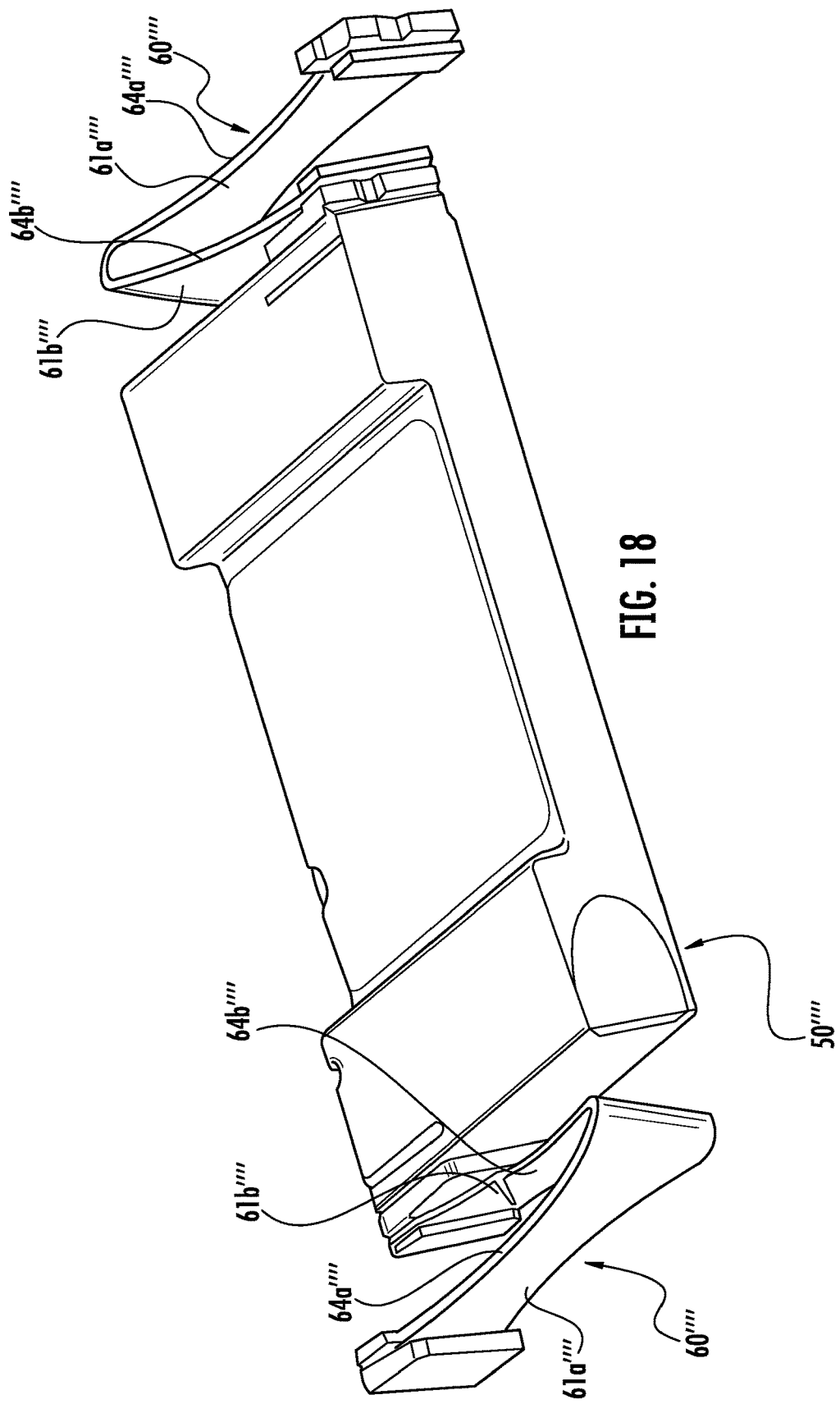
FIG. 18 is a perspective view of another portion of the haptic actuator of FIG. 17.
Figure 11:
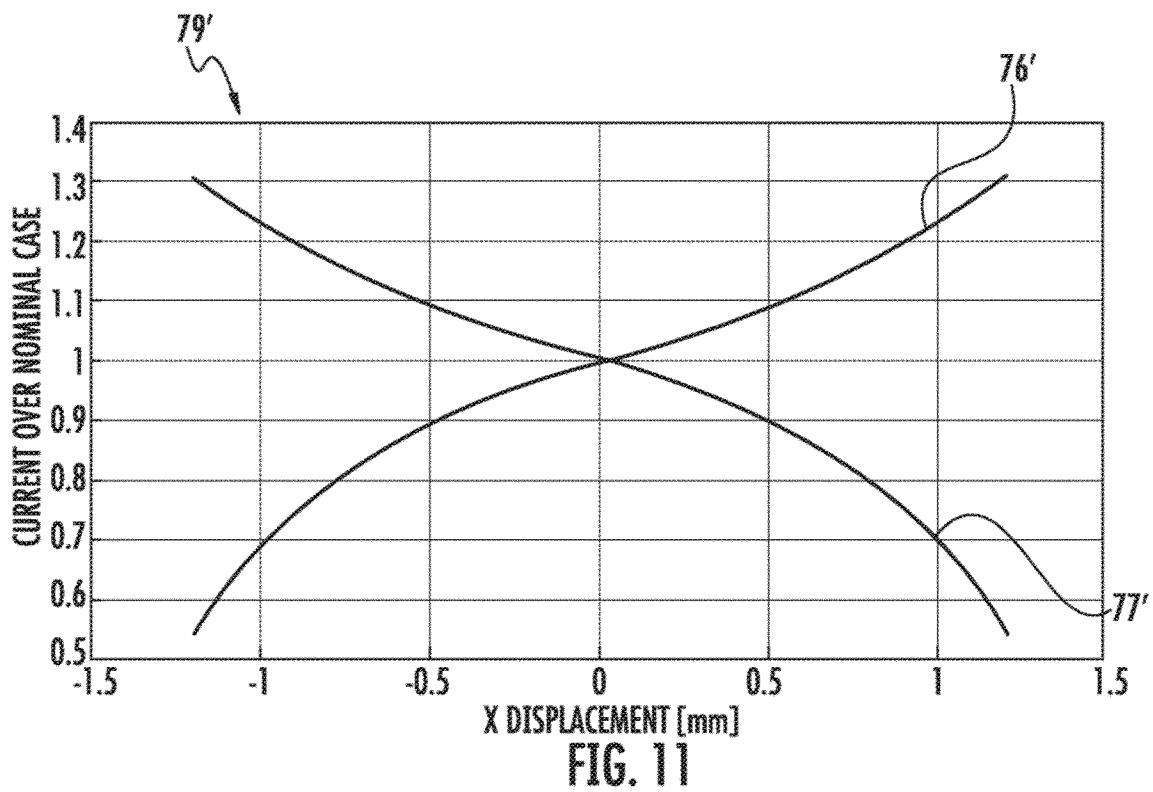

Referring now to FIGS. 17-18 in another embodiment, a haptic actuator 40'''' includes a coil pair 44'''' that includes top and bottom opposing coils 44a'''', 44b''''. A field member 50'''' has opposing first and second sides and is moveable within a housing between the coil pair 44''''. The field member 50'''' includes first and second permanent magnets 51a'''', 51b'''' and a respective flexure bearing 60'''' mounting each of the first and second sides of the field member 50'''' within the housing responsive to the coil pair 44''''. Illustratively, the respective flexure bearings 60'''' are coupled at diagonal corners of the field member 50''''. Each flexure bearing 60'''' has two diverging arms 61a'''', 61b'''' each having a reduced size medial portion 64a'''', 64b'''' relative to respective proximal and distal ends. More particularly, each arm 61a'''', 61b'''' has a blade shape having a length between respective proximal and distal ends, a thickness, and height with a varying profile defining the reduced sized medial portion 64a'''', 64b''''.

The respective flexure bearings 60'''' and the field member 50'''' each have a resonant frequency of torsion associated therewith. A controller 22'''' is coupled to the coil pair 44'''' and drives the haptic actuator to the resonant frequency of torsion. More particularly, the controller 22'''' drives the haptic actuator 40'''' to the resonant frequency of torsion by applying opposing polarity voltages, for example, in an alternating fashion, to each coil of the coil pair 44''''. Thus, the coils 44a'''', 44b'''' may be driven to induce torsional motions that may serve as higher frequency notifications or haptic feedback. The haptic actuator 40'''' illustrated in FIG. 18 corresponds to a rocking mode resonant frequency (torsional) of about 300 Hz. Exemplary equations are as follows:

$$I_{yy}\ddot{\theta} + b_{yy}\dot{\theta} + K_{yy}\theta = \tau = \sum K_m z * I$$

$$I_{yy} = 100 \text{ gmm}^2$$

$$K_{yy} = 375 \frac{N\text{mm}}{\text{rad}}$$

$$f_{0,Rocking} = 307 \text{ Hz}$$

$$(I_{eff} = 101 \text{ gmm}^2)$$

Elements illustrated, but not specifically described, are similar to those described above.

A method aspect is directed to a method of using a haptic actuator 40'''' that includes a housing 41'''' having a top 42'''' and bottom 43'''', a coil pair 44'''' carried within the housing and that includes top and bottom opposing coils 44a'''', 44b'''', and a field member 50'''' having opposing first and second sides and moveable within the housing between the coil pair and that includes at least one permanent magnet 51a'''', 51b''''. That haptic actuator 40'''' also includes a respective at least one flexure bearing 60'''' mounting each of the first and second sides of the field member 50'''' to be reciprocally movable within the housing 41'''' responsive to the coil pair 44a'''', 44b''''. The method includes using a controller 22'''' coupled to the coil pair 44a'''', 44b'''' to drive the haptic actuator 40'''' to a resonant frequency of torsion associated with the respective at least one flexure bearing 60'''' and the field member 50''''.

Further details and equations corresponding to the mathematical relationship among coils for the above embodiments is now described. In particular, coil force is a product of the motor constant and the current:

$$F_x^{coil} = \begin{cases} K_m^{UL}(x,z)I^{UL}(t) \\ K_m^{UR}(x,z)I^{UR}(t) \\ K_m^{BL}(x,z)I^{BL}(t) \\ K_m^{BR}(x,z)I^{BR}(t) \end{cases}$$

The sum of the force from all the coils moves the mass:

$$F_z = \Sigma F_z = \Sigma K_m^i(x,z)I^i(t) = m\ddot{x} + c\dot{x} + k_x x$$

Given symmetry across the x-axis and the z-axis, individual motor constants are related as follows:

$$K_m^{UL}(x,z) = K_m^{UR}(-x,z)$$

$$K_m^{BL}(x,z) = K_m^{BR}(-x,z)$$

$$K_m^{UL}(x,z) = K_m^{BL}(-x,z)$$

$$K_m^{UR}(x,z) = K_m^{BR}(-x,z)$$

The left, right, top, and bottom coil motor constants are defined as the sum of paired coils. This makes the left and right coil pair motor constants independent of the z-axis:

$$K_m^L(x) = K_m^{UL}(x,z) + K_m^{BL}(x,z) = K_m^{UL}(x,z) + K_m^{UL}(x,-z)$$

$$K_m^R(x) = K_m^{UR}(x,z) + K_m^{BR}(x,z) = K_m^{UR}(x,z) + K_m^{UR}(x,-z)$$

$$K_m^U(x,z) = K_m^{UL}(x,z) + K_m^{UR}(x,z)$$

$$K_m^B(x,z) = K_m^{BL}(x,z) + K_m^{BR}(x,z)$$

In the example, the left and right motor constants have a quadratic fit, independent of the z-axis:

$$K_m^L(x) = -ax^2 - bx + c$$

$$K_m^R(x) = -ax^2 - bx + c$$

Although top and bottom coil motor constants are dependent on both the x-axis and the z-axis, it is still quadratic:

$$K_m^U(x,z) = -\alpha + \beta z - \gamma(1-z)x^2$$

$$K_m^B(x,z) = -\alpha + \beta z - \gamma(1-z)x^2$$

By combining left and right coils (or top and bottom coils) the total motor constant is made independent of the Z-axis:

$$K_m^{tot}(x) = c - ax^2$$

Meanwhile, back EMF voltage of each coil is computed through the motor constant, multiplied by velocity:

$$V_{BEMF}^{coil} = \begin{cases} K_m^{UL}\dot{x} \\ K_m^{UR}\dot{x} \\ K_m^{BL}\dot{x} \\ K_m^{BR}\dot{x} \end{cases}$$

Relating the left and right coil motor constants back to back EMF voltage:

$$V_{BEMF}^L = K_m^L(x)\dot{x}$$

$$V_{BEMF}^R = K_m^R(x)\dot{x}$$

By taking the ratio, a motor constant ratio function $K_R^i(x)$ is defined:

$$\frac{V_{BEMF}^L}{V_{BEMF}^R} = \frac{K_m^L(x)}{K_m^R(x)} = K^{\frac{L}{R}}(x)$$

The inverse of this function provides the x-axis position based on the ratio of motor constants, dependent on the back EMF voltage:

$$x = (K^{\frac{L}{R}})^{-1}\left(\frac{V_{BEMF}^L}{V_{BEMF}^R}\right)$$

Similarly, forces in Z:

$$F_x^i = K_{m,x}^i(x,z)I^i(t)$$

And torque:

$$\tau = F_z^U z^U + F_x^B z^B$$

$$\tau = K_m^U(x)I^U z^U + K_m^B(x)I^B z^B$$

$$\tau = K_m^{UR}(x)I^{UR}z^U + K_m^{UL}(x)I^{UL}z^U + K_m^{BR}(x)I^{BR}z^B + K_m^{BL}(x)I^{BL}z^B$$

Forces in the x-axis and z-axis directions, and torque can then be put into a matrix:

$$\begin{bmatrix} F_x \\ F_z \\ \tau \end{bmatrix} = \begin{bmatrix} K_m^{UL} & K_m^{UR} & K_m^{BL} & K_m^{BR} \\ K_{m,z}^{UL} & K_{m,z}^{UR} & K_{m,z}^{BL} & K_{m,z}^{BR} \\ K_m^{UL}z^U & K_m^{UR}z^U & K_m^{BL}z^B & K_m^{BR}z^B \end{bmatrix} \begin{bmatrix} I^{UL} \\ I^{UR} \\ I^{BL} \\ I^{BR} \end{bmatrix}$$

As will be appreciated by those skilled in the art, while several embodiments have been individually described herein, any one or more elements from any one embodiment may be used with any one or more elements from any other embodiment. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A haptic actuator comprising:
   a housing;
   a plurality of coils carried within the housing;
   a field member moveable within the housing between the plurality of coils and comprising at least one permanent magnet; and
   a controller coupled to the plurality of coils and configured to
   sense a respective back electromotive force (EMF) value of each of the plurality of coils, and
   determine a position of the field member in a plurality of dimensions based upon the back EMF values and motor constant values.

2. The haptic actuator of claim 1 wherein the housing has a top and bottom; wherein the plurality of coils comprises a plurality of coil pairs, each coil pair comprising top and bottom opposing coils, the motor constant values corresponding to respective motor constant values associated with each coil pair; and wherein the controller is configured to sense the respective back EMF value of each coil pair.

3. The haptic actuator of claim 1 wherein the housing has a top and bottom; wherein the plurality of coils comprises a plurality of coil pairs, each coil pair comprising top and bottom opposing coils; and wherein the controller is configured to sense the respective back EMF value of at least one coil pair while driving at least one other coil pair.

4. The haptic actuator of claim 1 wherein the housing has a top and bottom; wherein the plurality of coils comprises a plurality of coil pairs, each coil pair comprising left and right opposing coils, the motor constant values corresponding to respective motor constant values associated with each coil pair; and wherein the controller is configured to sense the respective back EMF value of each coil pair.

5. The haptic actuator of claim 1 wherein the housing has a top and bottom; wherein the plurality of coils comprises at least one coil pair; wherein the field member has opposing first and second sides; wherein the haptic actuator further comprises a respective at least one flexure bearing mounting each of the first and second sides of the field member to be reciprocally movable within the housing responsive to the at least one coil pair, the respective at least one flexure bearing and the field member having a resonant frequency of torsion associated therewith; and wherein the controller is configured to drive the haptic actuator to the resonant frequency of torsion.

6. The haptic actuator of claim 1 wherein the plurality of coils comprises at least four coils.

7. The haptic actuator of claim 1 wherein the controller determines the position of the field member along an x-axis dimension, a z-axis dimension, and a rotational dimension.

8. The haptic actuator of claim 1 wherein the controller is configured to drive each of the plurality of coils based upon the position of the field member in the plurality of dimensions.

9. The haptic actuator of claim 1 wherein the controller is configured to sense and drive each coil at a same time.

10. The haptic actuator of claim 1 wherein the controller is configured to sense and drive each coil at a different time.

11. The haptic actuator of claim 1 wherein the field member has opposing first and second sides; and further comprising a respective at least one flexure bearing mounting each of the first and second sides of the field member to be reciprocally movable within the housing responsive to the plurality of coils.

12. The haptic actuator of claim 11 wherein the respective at least one flexure bearing has a wishbone shape.

13. The haptic actuator of claim 1 wherein each coil has a racetrack shape.

14. The haptic actuator of claim 1 wherein the at least one permanent magnet comprises a plurality of permanent magnets.

15. A haptic actuator comprising:
a housing;
at least four coils carried within the housing;
a field member moveable within the housing between the at least four coils and comprising at least one permanent magnet; and
a controller coupled to the at least four coils and configured to
sense a respective back electromotive force (EMF) value of each of the at least four coils,
determine a position of the field member in a plurality of dimensions based upon the back EMF values and motor constant values, and
drive each of the at least four coils based upon the position of the field member in the plurality of dimensions.

16. The haptic actuator of claim 15 wherein the housing has a top and bottom; wherein the at least four coils comprise a plurality of coil pairs, each coil pair comprising top and bottom opposing coils, the motor constant values corresponding to respective motor constant values associated with each coil pair; and wherein the controller is configured to sense the respective back EMF value of each coil pair.

17. The haptic actuator of claim 15 wherein the housing has a top and bottom; wherein the at least four coils comprise a plurality of coil pairs, each coil pair comprising top and bottom opposing coils; and wherein the controller is configured to sense the respective back EMF value of at least one coil pair while driving at least one other coil pair.

18. The haptic actuator of claim 15 wherein the housing has a top and bottom; wherein the at least four coils comprise a plurality of coil pairs, each coil pair comprising left and right opposing coils, the motor constant values corresponding to respective motor constant values associated with each coil pair; and wherein the controller is configured to sense the respective back EMF value of each coil pair.

19. The haptic actuator of claim 15 wherein the controller determines the position of the field member along an x-axis dimension, a z-axis dimension, and a rotational dimension.

20. A method of using a haptic actuator comprising a housing, a plurality of coils carried within the housing, and a field member moveable within the housing between the plurality of coils and comprising at least one permanent magnet, the method comprising:
using a controller coupled to the plurality of coils to
sense a respective back electromotive force (EMF) value of each of the plurality of coils, and
determine a position of the field member in a plurality of dimensions based upon the back EMF values and motor constant values.

21. The method of claim 20 wherein the housing has a top and bottom; wherein the plurality of coils comprises a plurality of coil pairs, each coil pair comprising top and bottom opposing coils, the motor constant values corresponding to respective motor constant values associated with each coil pair; and wherein the controller is used to sense the respective back EMF value of each coil pair.

22. The method of claim 20 wherein the housing has a top and bottom; wherein the plurality of coils comprises a plurality of coil pairs, each coil pair comprising top and bottom opposing coils; and wherein the controller is used to sense the respective back EMF value of at least one coil pair while driving at least one other coil pair.

23. The method of claim 20 wherein the housing has a top and bottom; wherein the plurality of coils comprises a plurality of coil pairs, each coil pair comprising left and right opposing coils, the motor constant values corresponding to respective motor constant values associated with each coil pair; and wherein the controller is used to sense the respective back EMF value of each coil pair.

24. The method of claim 20 wherein the housing has a top and bottom; wherein the plurality of coils comprises at least one coil pair; wherein the field member has opposing first and second sides; wherein the haptic actuator further comprises a respective at least one flexure bearing mounting each of the first and second sides of the field member to be reciprocally movable within the housing responsive to the at least one coil pair, the respective at least one flexure bearing and the field member having a resonant frequency of torsion associated therewith; and wherein the controller is used to drive the haptic actuator to the resonant frequency of torsion.

25. The method of claim 20 wherein the plurality of coils comprises at least four coils.

26. The method of claim 20 wherein the controller determines the position of the field member along an x-axis dimension, a z-axis dimension, and a rotational dimension.

27. The method of claim 20 wherein the controller drives each of the plurality of coils based upon the position of the field member in the plurality of dimensions.

* * * * *

UNITED STATES PATENT AND TRADEMARK OFFICE
CERTIFICATE OF CORRECTION

PATENT NO. : 10,345,907 B2
APPLICATION NO. : 15/814626
DATED : July 9, 2019
INVENTOR(S) : Hajati et al.

Page 1 of 3

It is certified that error appears in the above-identified patent and that said Letters Patent is hereby corrected as shown below:

In the Drawings

| | |
|---|---|
| Sheet 9 of 17 | Delete: FIG. 9 |
| | Insert: New FIG. 9 per the attached |
| Sheet 10 of 17 | Delete: FIG. 11 |
| | Insert: New FIG. 11 per the attached |

In the Specification

| | |
|---|---|
| Column 7, Line 8 | Delete: "75'" |
| | Insert: --78'-- |
| Column 7, Line 8 | Delete: "76'" |
| | Insert: --69'-- |
| Column 7, Line 15 | Delete: "75'" |
| | Insert: --79'-- |

Signed and Sealed this
Third Day of March, 2020

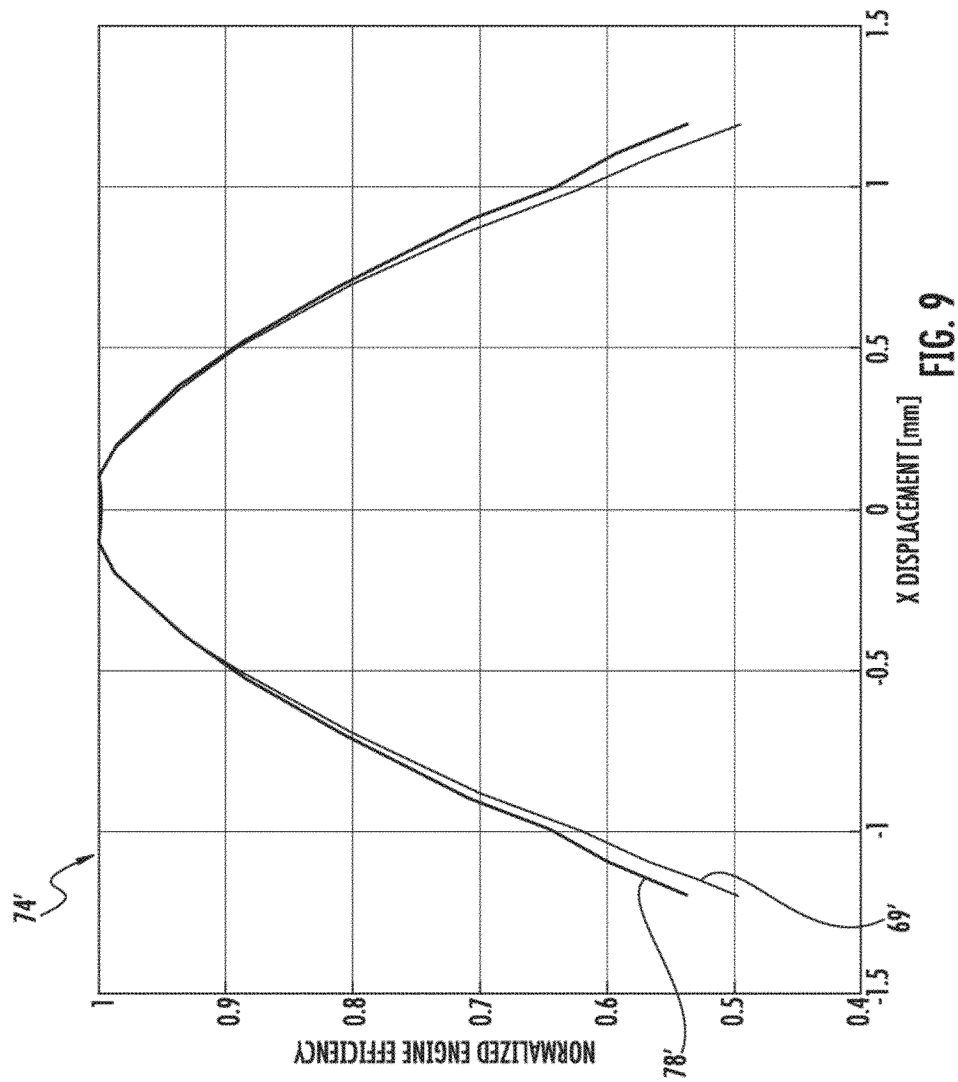

Andrei Iancu
*Director of the United States Patent and Trademark Office*